(12) United States Patent
Miyata

(10) Patent No.: US 8,308,187 B2
(45) Date of Patent: *Nov. 13, 2012

(54) AIRBAG, AIRBAG DEVICE, AND VEHICLE

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 397 days.

This patent is subject to a terminal disclaimer.

(21) Appl. No.: 12/641,716

(22) Filed: Dec. 18, 2009

(65) Prior Publication Data

US 2010/0156076 A1 Jun. 24, 2010

(30) Foreign Application Priority Data

Dec. 19, 2008 (JP) .................................. 2008-324020
Apr. 28, 2009 (JP) .................................. 2009-109454
Oct. 14, 2009 (JP) .................................. 2009-237414

(51) Int. Cl.
*B60R 21/231* (2006.01)
*B60R 21/233* (2006.01)

(52) U.S. Cl. .................. 280/729; 280/743.2; 280/743.1; 280/732

(58) Field of Classification Search .................. 280/729, 280/743.1, 743.2, 730.1, 732, 742
See application file for complete search history.

(56) References Cited

U.S. PATENT DOCUMENTS

| | | | | |
|---|---|---|---|---|
| 3,733,091 A * | 5/1973 | Fleck et al. | .................... | 280/729 |
| 6,846,008 B2 | 1/2005 | Kamiji et al. | | |
| 7,243,947 B2 * | 7/2007 | Bosch | .................... | 280/743.1 |
| 7,316,416 B2 * | 1/2008 | Hasebe et al. | ................ | 280/729 |
| 7,654,568 B2 * | 2/2010 | Yamada | .................... | 280/743.1 |
| 7,934,747 B2 * | 5/2011 | Miyata | .................... | 280/729 |
| 2006/0186647 A1 * | 8/2006 | Bosch | .................... | 280/729 |
| 2007/0262572 A1 * | 11/2007 | Fischer et al. | ............. | 280/730.1 |

FOREIGN PATENT DOCUMENTS

| | | |
|---|---|---|
| JP | 3746193 B2 | 6/2002 |
| JP | 2006-103654 A | 4/2006 |
| JP | 2008-254500 A | 10/2008 |

* cited by examiner

*Primary Examiner* — Ruth Ilan
(74) *Attorney, Agent, or Firm* — Fitch Even Tabin & Flannery, LLP

(57) ABSTRACT

An airbag comprises a right half airbag to be inflated on a front right side of an occupant, a left half airbag to be inflated on a front left side of the occupant, and a base-end chamber that communicates with base-end sides of the right half airbag and the left half airbag. The right half airbag and the left half airbag are stitched together by a seam. The interior of each of the bags and communicate with each other by upper part and lower part openings and. A vertically extended concave portion exists on a surface of the inflated airbag that faces the occupant. The concave portion is deepest in the intermediate part and shallow in the upper part and lower part.

12 Claims, 31 Drawing Sheets

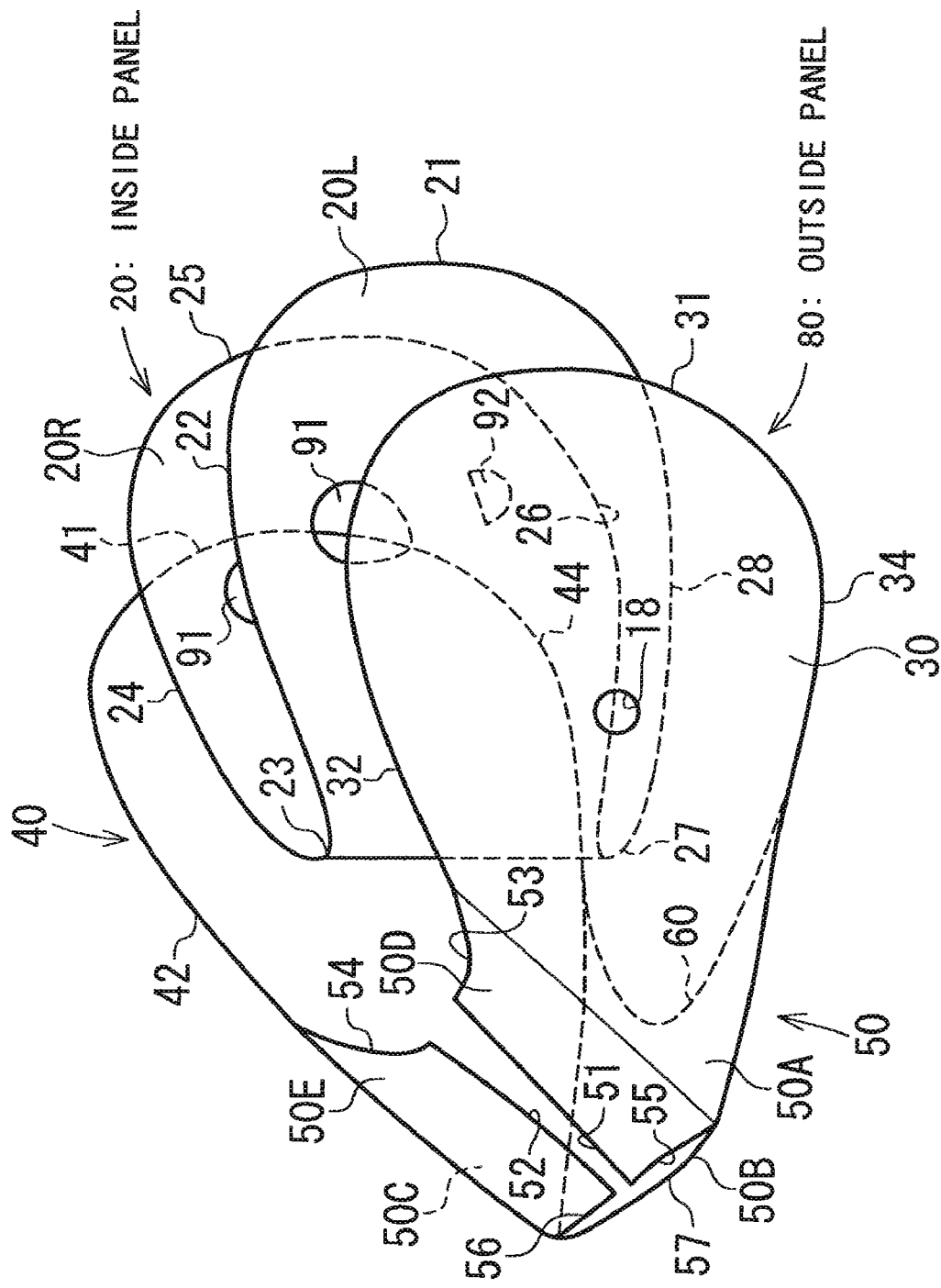

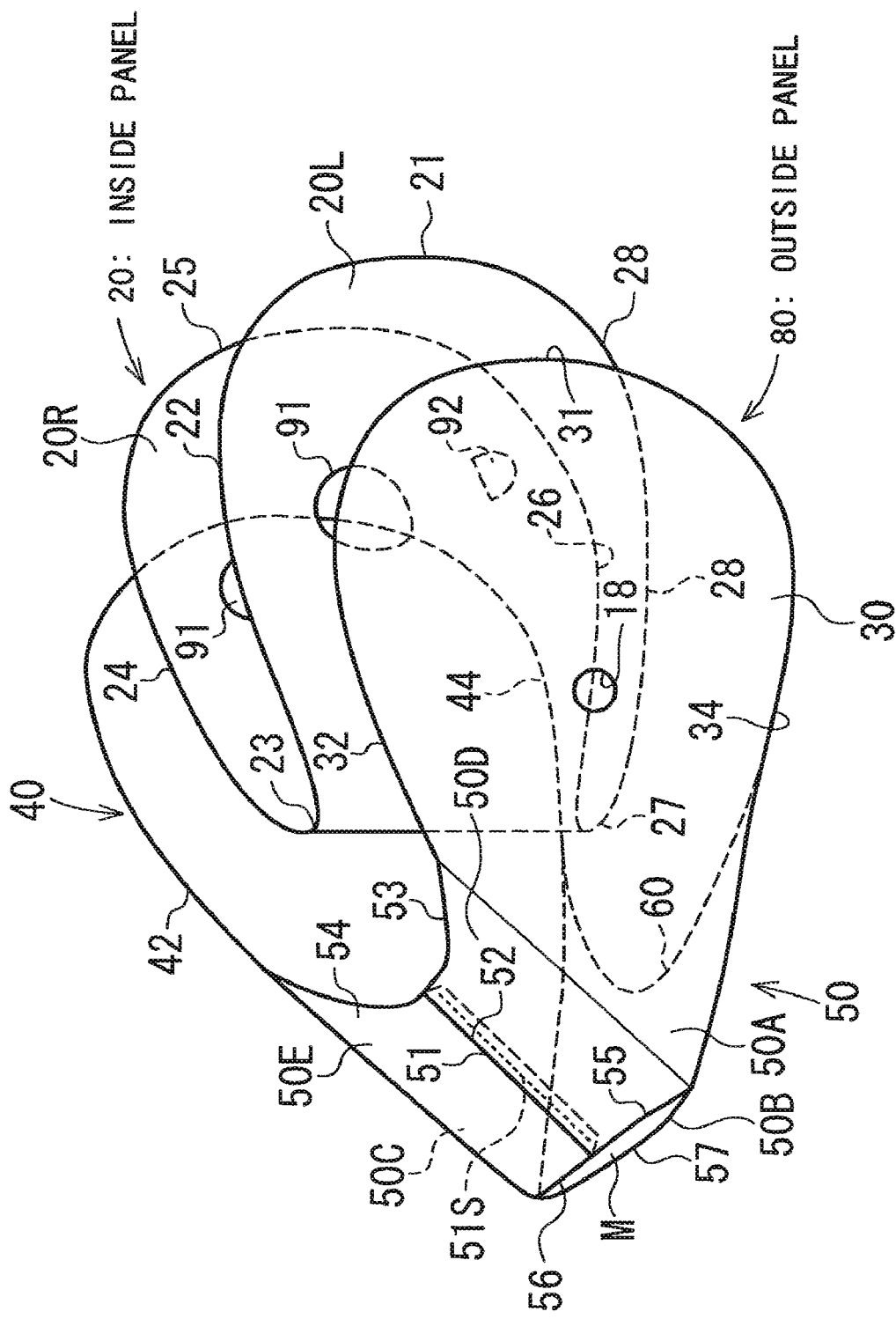

US 8,308,187 B2

AIRBAG, AIRBAG DEVICE, AND VEHICLE

RELATED APPLICATIONS

This application claims priority under 35 U.S.C. §119 to Japanese Patent Application Nos. JP2008-324020 filed on Dec. 19, 2008, JP2009-109454 filed on Apr. 28, 2009 and JP2009-237414 filed on Oct. 14, 2009, the entire contents of which are hereby incorporated by reference.

FIELD OF THE INVENTION

The present invention relates to an airbag and an airbag device for restraining an occupant in the event of a vehicle collision or the like. More particularly, the present invention relates to an airbag and an airbag device in which a concave portion is formed in the vertical direction on an airbag surface facing the occupant in an inflated state. The present invention also relates to a vehicle provided with this airbag.

BACKGROUND OF THE INVENTION

JP, A, 2006-103654 describes an airbag for restraining an occupant in the event of a vehicle collision or the like, in which a concave portion is formed in the vertical direction on the airbag surface facing the occupant in an inflated state. Paragraph 0039 of the above prior art discloses that, in the event of a frontal collision, the shoulder portion of the occupant is restrained by a shoulder restraining portion located on both sides of the above-described concave portion of the inflated airbag, causing the head portion of the occupant to be restrained as it enters the concave portion.

In the above-described airbag of prior art, the left-side shoulder restraining portion and the right-side shoulder restraining portion communicate with each other via a large hole close to the size of a longitudinal plane of the shoulder restraining portions in the front-back direction.

Further, in this airbag, as shown in FIG. 4, the depth of the concave portion is shallowest in the vertical intermediate part, and gradually deepens upward and downward from this intermediate part.

SUMMARY OF THE INVENTION

It is therefore an object of the present invention to provide an airbag, airbag device, and vehicle provided with this airbag device, which are suitable for restraining an occupant seated toward the left or the right in a front-passenger seat.

It is a further object of the present invention to provide an airbag, airbag device, and vehicle provided with this airbag device, which are suitable for receiving a small occupant in the event of a frontal collision.

In order to achieve the above-mentioned object, according to the first invention, there is provided an airbag comprising: a vertically extended concave portion formed so as to face a front-passenger seat occupant in an inflated state in front of the occupant; a left chamber positioned in front of a left half of the occupant; a right chamber positioned in front of a right half of the occupant; a panel that separates the left chamber and the right chamber; and a first opening disposed at an upper part of the panel that passes through the left chamber and the right chamber.

According to the second invention, in the airbag according to the first invention, an opening area of the first opening is 7,500 to 50,000 mm$^2$; and a height from a lowest end of the airbag in the inflated state to an occupant side of a lower edge of the first opening in the inflated state is 200 to 670 mm.

According to the third invention, in the first invention, the airbag further comprises a second opening disposed at a lower part of the panel that passes through the left chamber and the right chamber.

According to the fourth invention, in the airbag according to the third invention, an opening area of the second opening is 1,200 to 32,000 mm$^2$; and a height from an upper edge of the second opening in the inflated state to a lower edge of the second opening in the inflated state is 35 to 200 mm.

According to the fifth invention, in the airbag according to the first invention, a depth of the concave portion in an intermediate part along a vertical direction is greater than both of a depth of the concave portion in an upper part and a depth of the concave portion in a lower part.

According to the sixth invention, in the airbag according to the fifth invention, a depth $d_1$ of the concave portion in the upper part is 5 to 200 mm; a depth $d_2$ of the concave portion in the intermediate part is 25 to 400 mm; and a depth $d_3$ of the concave portion in the lower part is 5 to 200 mm.

According to the seventh invention, in the airbag according to the sixth invention, the concave portion in the intermediate part is a portion having a depth of 25 to 400 mm, and the concave portion in the intermediate part extends vertically 150 to 400 mm.

According to the eighth invention, in the airbag according to the seventh invention, in the intermediate part, the more the concave portion is in an upper part, the more a depth of the concave portion is greater.

According to the ninth invention, in the airbag according to the sixth invention, the concave portion in the intermediate part is configured so that a tangential direction within a vertical plane of at least one portion of an inmost part of the concave portion is inclined toward a vehicle front.

According to the tenth invention, in the first invention, the airbag further comprises a base-end chamber disposed on a vehicle front side; a left half airbag that is continuous with the base-end chamber and is to be inflated on a front left side of the occupant; and a right half airbag that is continuous with the base-end chamber and is to be inflated on a front right side of the occupant; wherein: the left half airbag and the right half airbag are stitched together on mutually face-to-face portions; a thread line of the stitching extends vertically; and the thread line in the intermediate part curves so that at least one portion of the thread is positioned away from a surface facing the occupant.

According to the eleventh invention, in the first invention, the airbag further comprises a hollow portion that passes substantially vertically through the airbag in the inflated state that the airbag inflates from an instrument panel of the vehicle toward a vehicle rear so as to approach the occupant, wherein the hollow portion is configured so that, when the airbag is in the inflated state, at least one portion of a lower end side of the hollow portion is positioned closer to a vehicle rear than an end portion on a vehicle rear side of the instrument panel.

According to the twelfth invention, there is provided the airbag device having the airbag in the first invention and an inflator that inflates the airbag.

According to the thirteenth invention, there is provided a vehicle having the airbag device in the twelfth invention.

In the airbag of the present invention, the left and right chambers are separated by a panel, and a first opening is provided in the upper part of this panel.

When a frontal collision occurs with the occupant of the front-passenger seat seated toward the left, for example, the occupant is mainly received by the left chamber of the air bag, causing the pressure of the left chamber to become higher than that of the right chamber. The gas in the upper part of this left chamber then flows to the right chamber via the first opening, thereby alleviating the impact applied to the head portion of the occupant. Furthermore, because the left and right chambers are separated by a panel, the rigidity of the bag is higher compared to an airbag that is not provided with a panel. As a result, the restraining force that restrains the occupant seated toward the left increases.

That is, in a case where a panel is not provided between the left and right chambers as in prior art, the pressure inside the airbag increases for the entire airbag when an occupant seated toward the left contacts the airbag. As a result, the length to which the airbag is pressed toward the vehicle front on the left side of the airbag is longer than the length to which the airbag is pressed toward the vehicle front on the right side of the airbag. Conversely, with the airbag of the present invention provided with a panel that separates the two chambers, the pressure inside the left chamber increases more than that of an airbag not provided with a panel, thereby increasing the rigidity of the bag and, in turn, the restraining force on the occupant.

When, in an airbag of prior art that is not provided with a panel, an inflator having high output is used to increase the airbag internal pressure in order to increase the restraining force on an occupant seated toward the left, the cost of the inflator increases and the airbag internal pressure becomes excessively high when the airbag receives an occupant seated at the seat center.

While in the above the occupant is described as seated toward the left, the same advantages can be achieved even if the occupant is seated toward the right.

With the provision of the first opening, the upper parts of the left and right chambers of the airbag inflate and deploy equally, resulting in the advantage of the internal airbag pressure being equal in the left and right chambers as well.

In a case where there is provided a second opening for communicating the lower parts of the left and right chambers with each other, the lower parts of the left and right chambers of the airbag also inflate and deploy equally, also resulting in an equal airbag internal pressure in the left and right chambers.

In the airbag of the present invention, a concave portion that extends vertically is provided on the surface facing the occupant so that the head portion of the occupant enters the concave portion when the occupant is seated in the lateral center of the seat.

According to one aspect of the present invention, the vertical intermediate part of this concave portion of the airbag is deeper than the upper and lower parts. In a case where a frontal collision occurs when a small occupant is seated in the lateral center of the front-passenger seat, the head portion of the small occupant enters near the intermediate part of the concave portion so that it is sandwiched between both side portions of the concave portion. As a result, the forward moving velocity of the head portion does not suddenly decrease. The left and right sides of the thorax of the occupant are received by both side portions of the concave portion. When a frontal collision occurs with a large occupant in the front-passenger seat, the head portion of the occupant is received by the concave portion of the airbag upper part, and the left and right sides of the thorax are received by both side portions of the concave portion.

In another aspect of the present invention, the concave portion of the intermediate part has a depth of 25 to 400 mm, and extends vertically 150 to 400 mm.

In another aspect of the present invention, the depth of the concave portion of the intermediate part is as deep as the upper side. With such a configuration, the head portion of a small occupant that has entered the concave portion with the occupant in a forward leaning position plunges into this concave portion. As a result, the head portion of the small occupant is securely held within the concave portion, without shifting left and right.

In the present invention, the concave portion of the intermediate part is preferably configured so that the tangential direction within the vertical plane of at least one portion of the inmost part is inclined toward the vehicle front. In such a case, when the face of a small occupant reaches the inmost part of the concave portion, the orientation of the face substantially matches the tangential direction. As a result, the load on the neck of a small occupant is minimized.

According to yet another aspect of the present invention, the airbag comprises a left half airbag to be inflated on a front left side of an occupant, and a right half airbag to be inflated on a front right side of the occupant. The face-to-face surfaces of this left half airbag and right half airbag are then stitched together. Additionally, a concave portion is formed between the left half airbag and the right half airbag.

When an airbag according to this aspect of the present invention inflates in the event of a frontal collision and the occupant is seated in the lateral center, the left half airbag receives the left side of the thorax of the occupant, and the right half airbag receives the right side of the thorax of the occupant. The left and right sides of the thorax of the occupant have hard strong ribs. The airbag receives and absorbs an impact to the occupant through the ribs. The airbag has a valley-shaped concave portion between the front ends of the left half airbag and the right half airbag in an inflated state. This concave portion faces a vicinity of breastbones located at the thorax center of the occupant. Accordingly, when the body of the occupant plunges into the airbag, the vicinity of the breastbones does not receive a large reaction force of the airbag, thereby decreasing a load on the breastbones.

The seam of the above-described stitching extends vertically, curving so that it is positioned away from the surface facing the occupant at the above-described intermediate part. With this arrangement, the concave portion gradually deepens from the upper and lower parts toward the intermediate part.

The airbag is provided with a hollow portion that passes through the inflated airbag in the substantial vertical direction. Then, with the airbag an inflated state, at least one portion of the lower side of the hollow portion is positioned closer to the vehicle rear than the end portion of the instrument panel on the vehicle rear side. With this arrangement, even if an object is present in the vicinity of the instrument panel, the object is engulfed in the hollow portion when the airbag inflates.

BRIEF DESCRIPTION OF THE DRAWINGS

FIG. 10 is an exploded perspective view of the airbag shown in FIG. 1.

FIG. 11 is an exploded perspective view of the airbag shown in FIG. 1.

DETAILED DESCRIPTION OF THE PREFERRED EMBODIMENTS

Embodiments of the present invention will now be described with reference to accompanying drawings.

Figure 1:
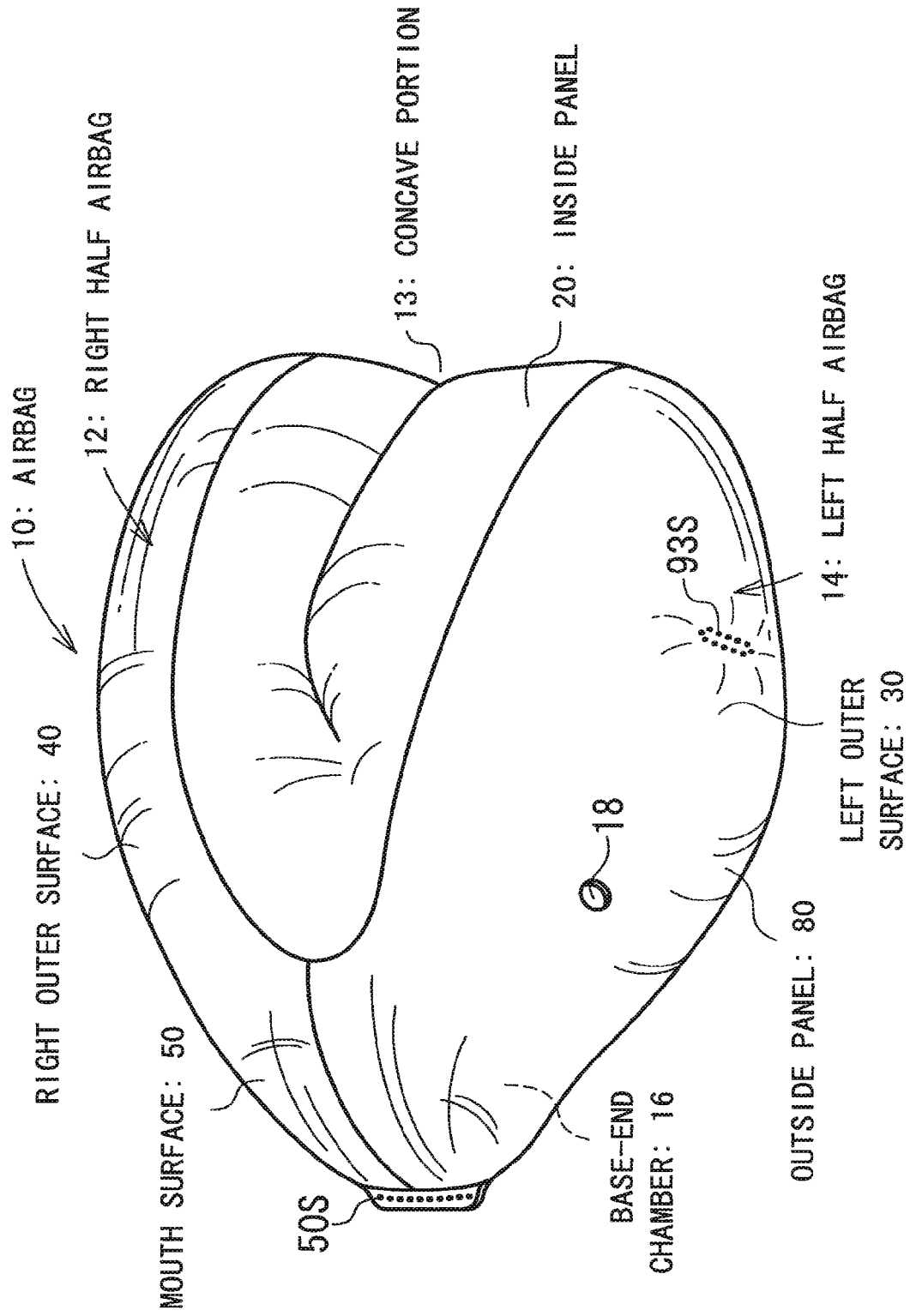
FIG. 1 is a perspective view of the airbag according to an embodiment of the present invention.
Figure 2:
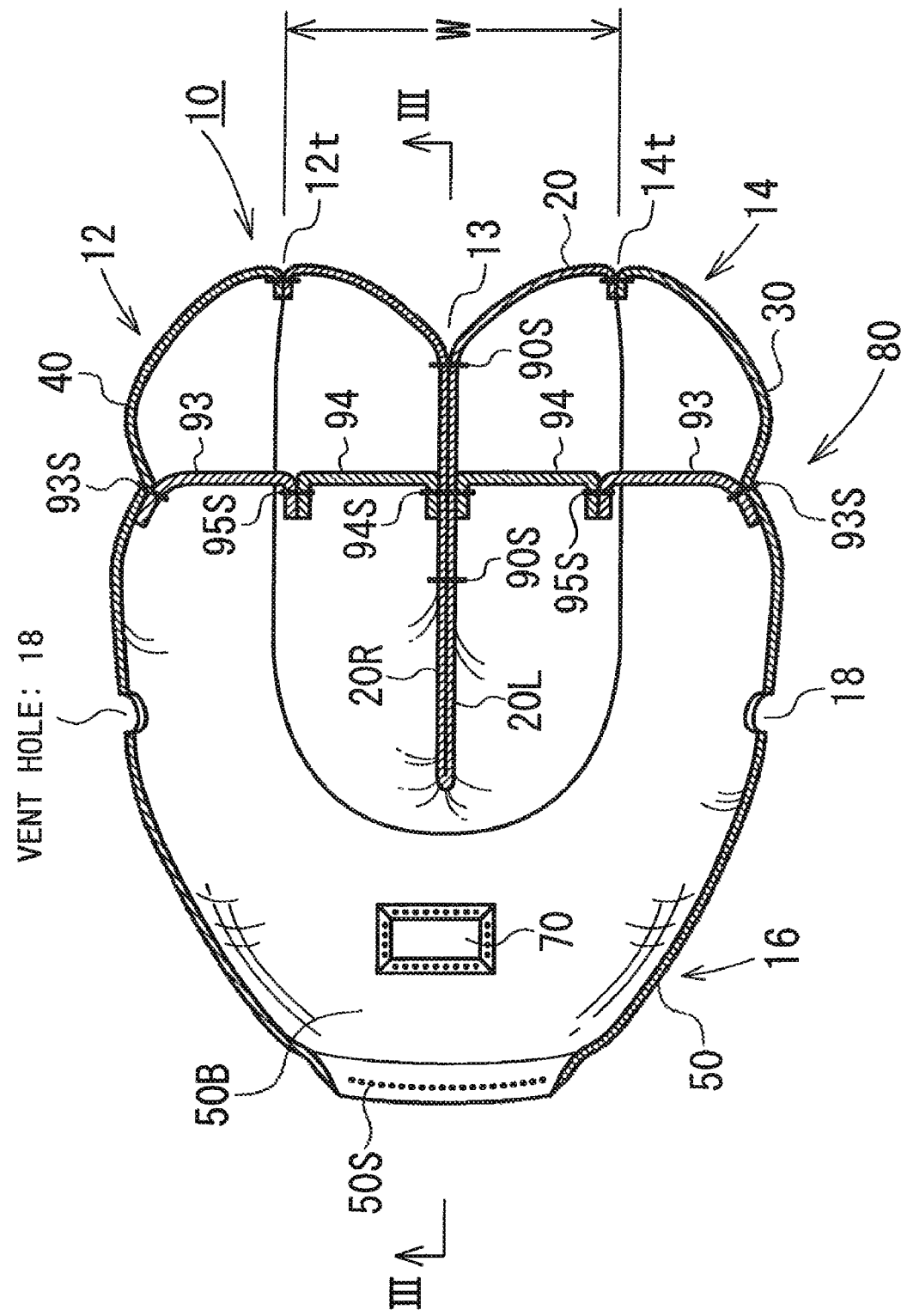
FIG. 2 is a horizontal cross-sectional view of the airbag shown in FIG. 1.
Figure 3:
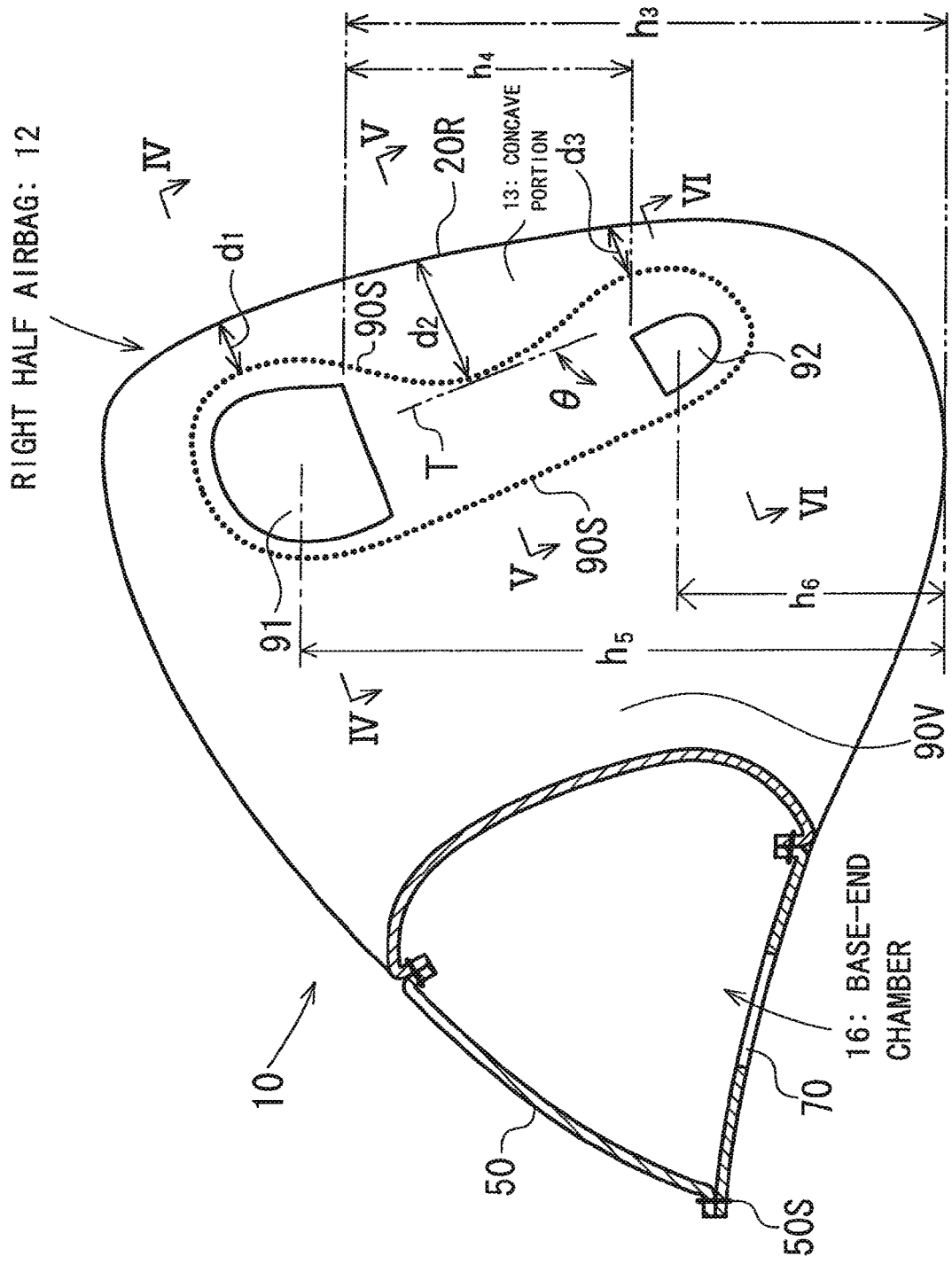
FIG. 3 is a cross-sectional view taken along line in FIG. 2.
Figure 4:
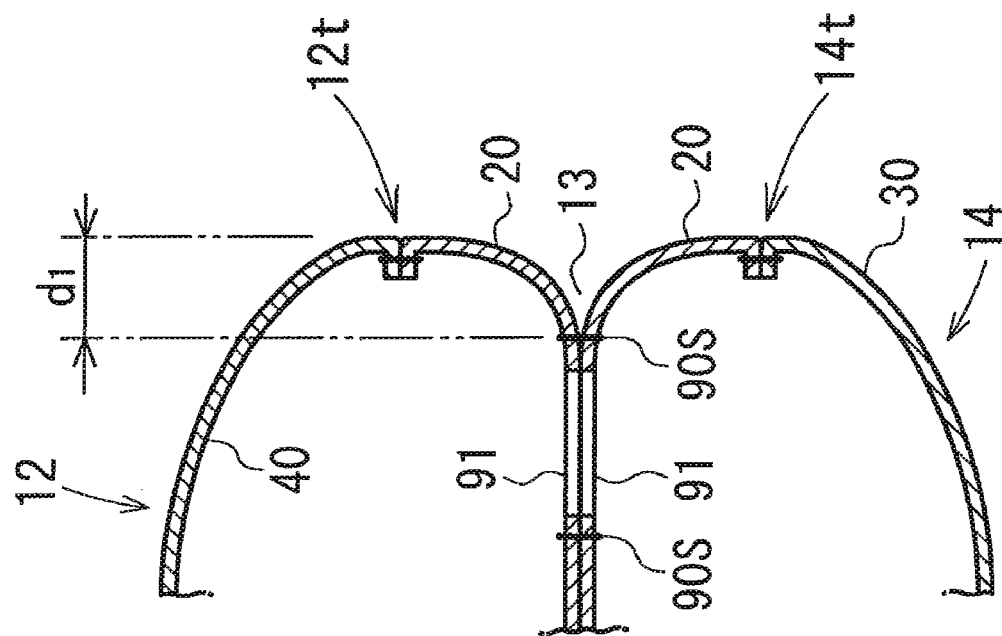
FIG. 4 is a cross-sectional view taken along line IV-IV in FIG. 3.
Figure 5:
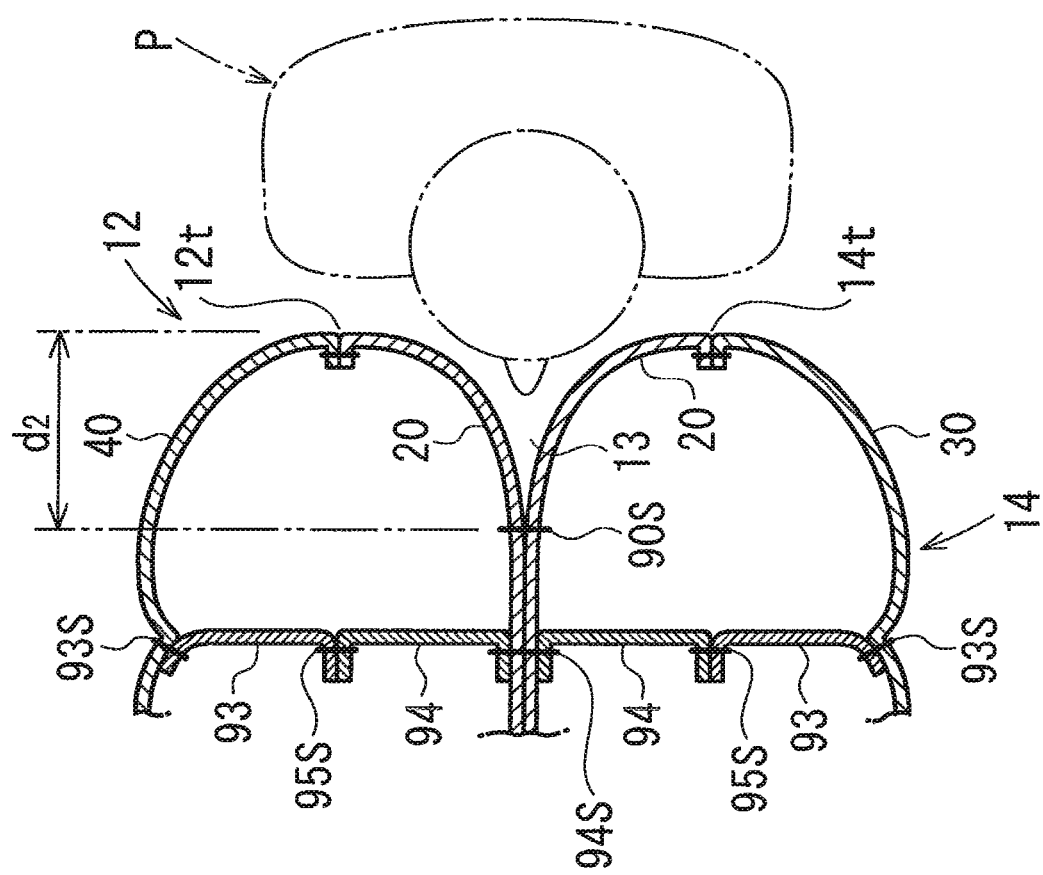
FIG. 5 is a cross-sectional view taken along line V-V in FIG. 3.
Figure 6:
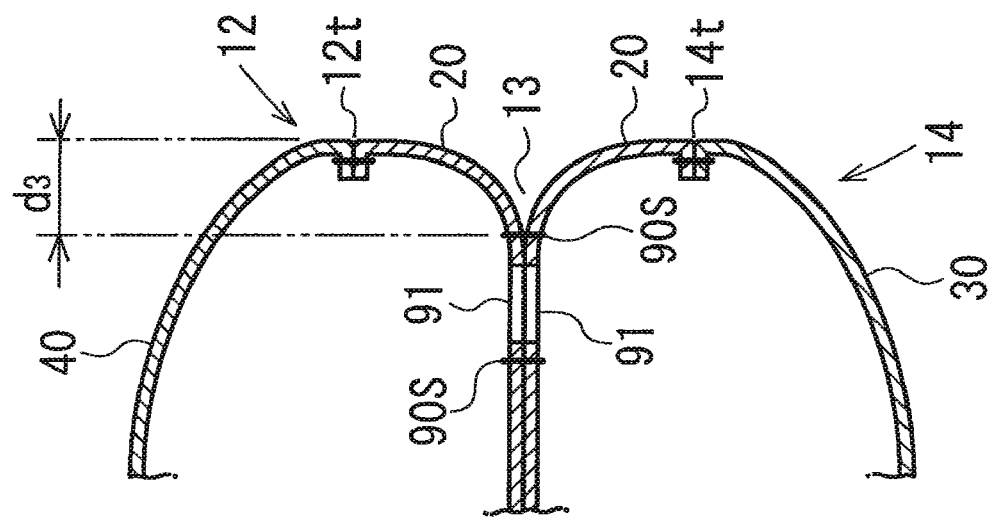
FIG. 6 is a cross-sectional view taken along line VI-VI in FIG. 3.
Figure 7:
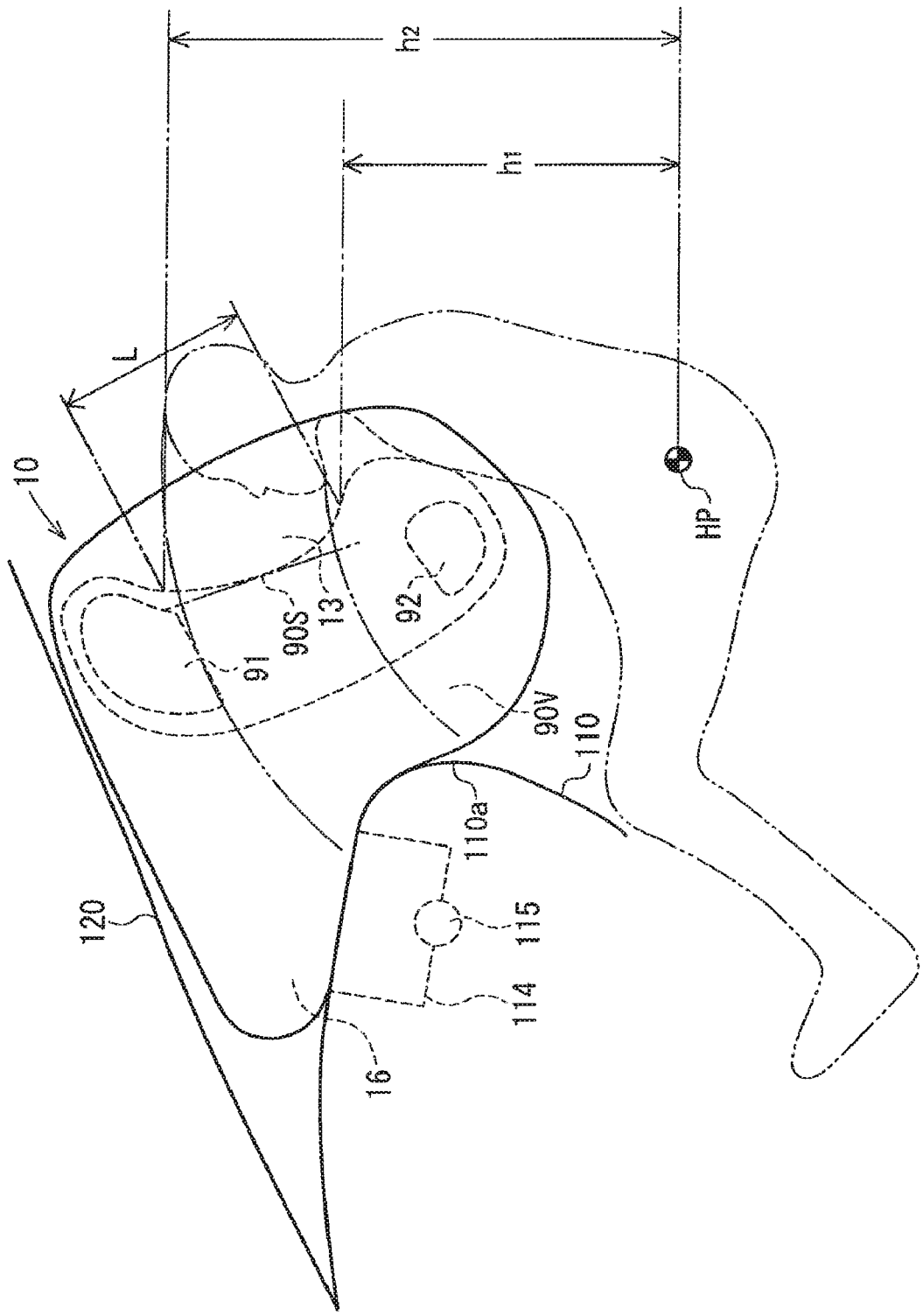
FIG. 7 is a side view of the airbag shown in FIG. 1.
Figure 8:
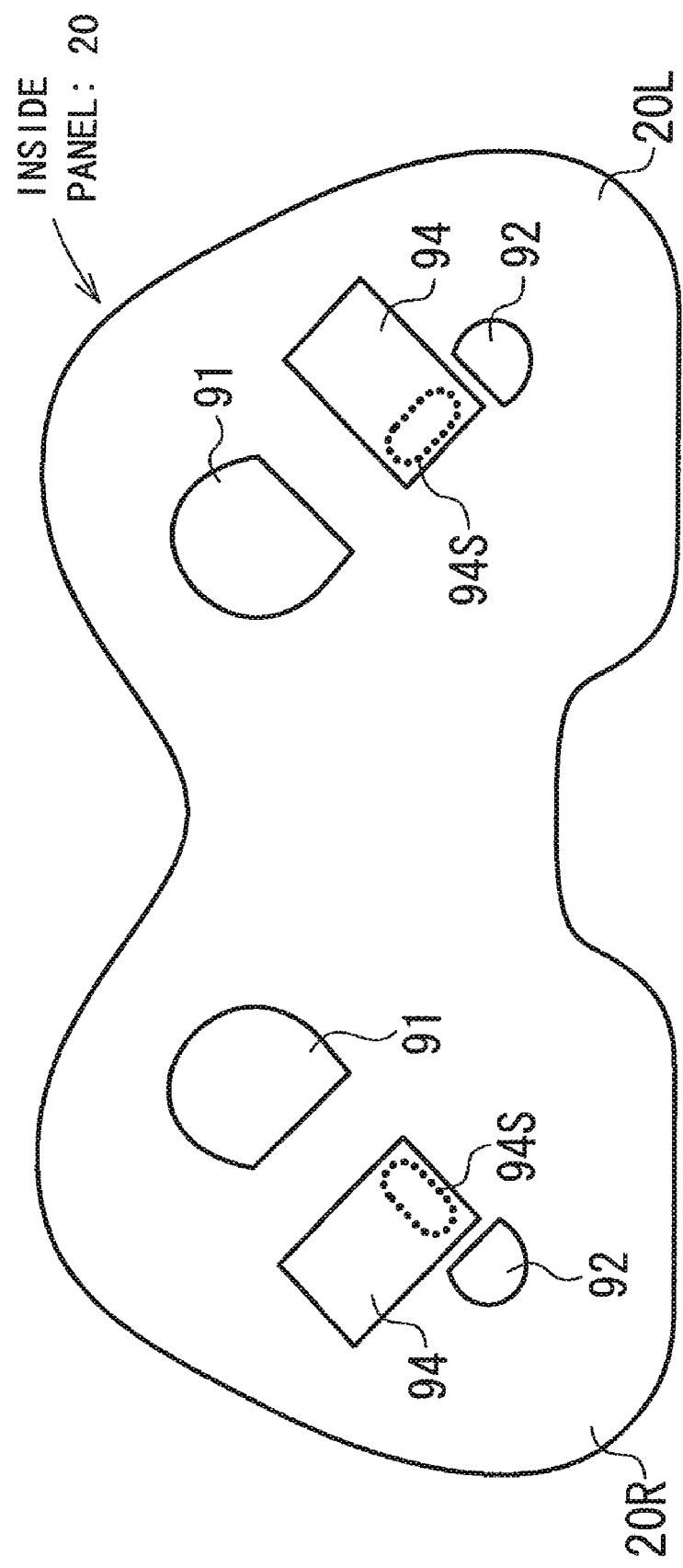
FIG. 8 is a plane view of the inside panel.
Figure 9:
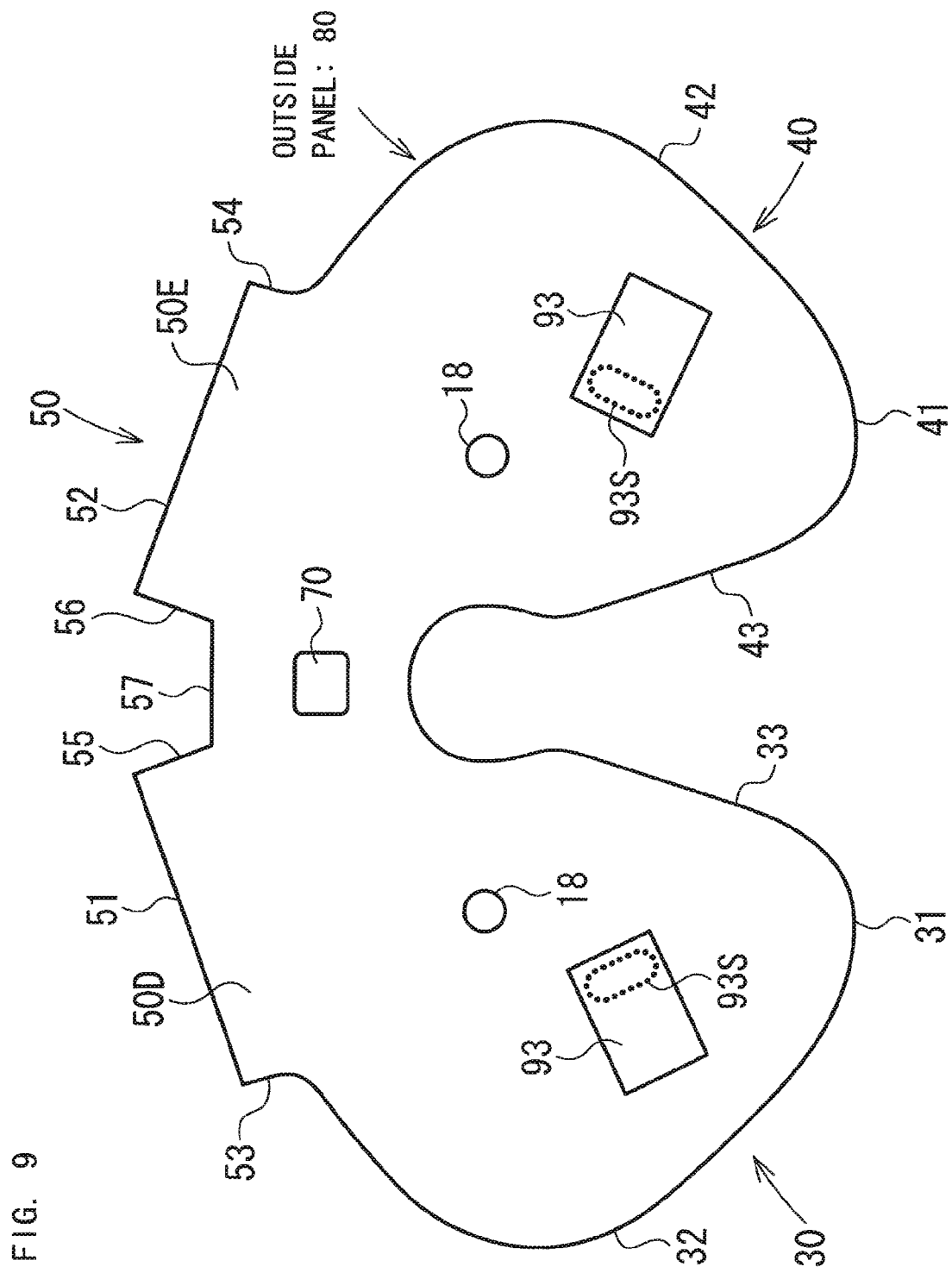
FIG. 9 is a plane view of the outside panel.

FIG. 1 is a perspective view from above of an airbag in an inflated state according to an embodiment of the present invention. FIG. 2 is a horizontal cross-sectional view of this airbag. FIG. 3 is a cross-sectional view taken along line in FIG. 2. FIGS. 4, 5, and 6 are cross-sectional views taken along lines IV-IV, V-V, and VI-VI in FIG. 3. FIG. 7 is a side view of the inflated airbag. FIG. 8 is a plane view of the inside panel. FIG. 9 is a plane view of the outside panel. FIG. 10 and FIG. 11 are exploded perspective views of this airbag.

An airbag 10 comprises a right half airbag 12 to be inflated on a right front side of an occupant, a left half airbag 14 to be inflated on a front left side of the occupant, and a base-end chamber 16 communicating with the base ends of the right half airbag 12 and the left half airbag 14. The interior of the right half airbag 12 is a right chamber, and the interior of the left half airbag 14 is a left chamber. The face-to-face surfaces of the left half airbag 14 and the right half airbag 12 are stitched together by a seam 90S.

The right half airbag 12 and the left half airbag 14 communicate with each other via a first opening 91 and a second opening 92 provided on each of the above-described face-to-face surfaces. The first opening 91 is provided in the upper part of the airbag 10, and the second opening 92 is provided in the lower part of the airbag 10. The opening area of the opening 91 is preferably 7500 to 50000 mm$^2$, more preferably about 20000 to 40000 mm$^2$. The opening area of the opening 92 is preferably 1200 to 31400 mm$^2$, more preferably about 1900 to 20000 mm$^2$. The seam 90S extends around the openings 91 and 92.

With this airbag 10 in a fully inflated state, a height $h_3$ (refer to FIG. 3) from the lowest part of the airbag 10 to the lower edge of the first opening 91 (preferably the end portion of the lower edge closer to the occupant of the first opening 91) is preferably 200 to 670 mm. A height $h_4$ from the upper edge of the second opening 92 to the lower edge of the first opening 91 is preferably 80 to 400 mm, more preferably about 150 to 300 mm.

With this airbag 10 in a fully inflated state, a height $h_5$ from the lowest part of the airbag 10 to the center of the area of the first opening 91 is preferably 170 to 830 mm. A height $h_6$ from the lowest part of the airbag 10 to the center of the area of the second opening 92 is preferably 20 to 350 mm, more preferably about 55 to 200 mm. When this opening is regarded as a sheet material having a uniform thickness and uniform density, the "center of the area" refers to the barycentric position of the sheet material.

When the airbag 10 is fully inflated, there is no bridge member such as a tie panel between the front ends of the right half airbag 12 and the left half airbag 14. A concave portion 13 that extends vertically is formed between the front ends of the right half airbag 12 and the left half airbag 14. This concave portion 13 opens toward the occupant (i.e., toward the right in FIG. 1 to FIG. 7). The inmost part of the concave portion 13 is the above-described seam 90S.

When this airbag 10 is fully inflated, as shown in FIG. 2, a distance W between a front end 12t of the right half airbag 12 and a front end 14t of the left half airbag 14 is preferably 150 to 450 mm, more preferably 170 to 430 mm.

According to this embodiment, the concave portion 13 is deepest in an intermediate part along a vertical direction, and gradually becomes decreases in depth upward and downward from the intermediate part. When the airbag 10 is fully inflated, a depth $d_1$ of the concave portion in the upper part is preferably 50 to 200 mm, more preferably 30 to 170 mm. A depth $d_2$ of the concave portion in the intermediate part is preferably 25 to 400 m, more preferably 50 to 350 mm. A depth $d_3$ of the concave portion in the lower part is preferably 5 to 200 m, more preferably 30 to 170 mm.

In the intermediate part of the concave portion 13, a range L in which the depth is 25 to 400 m (refer to FIG. 7) extends preferably 150 to 400 mm vertically, more preferably 200 to 300 mm vertically. Note that the length L which indicates this range is the length along the surface facing the occupant. A height difference $h_1$ between the position of the lower end of this length L and a hip point HP of a small occupant dummy of the FMVSS AF05 percentile (the frame of a fifth percentile female American adult specified in the Federal Motor Vehicle Safety Standard of the US) is preferably 240 to 460 mm. Additionally, a height difference $h_2$ between the upper end of this range L and the above-described hip point HP is preferably 460 to 670 mm.

In this embodiment, in the intermediate part of the above range L, a tangential direction T (refer to FIG. 3) within the vertical plane in the inmost part of the concave portion 13 is inclined toward the vehicle front. An inclination angle θ of this tangential direction T (i.e., the upward angle from the horizontal plane) is preferably 25 to 50°, more preferably about 30 to 45°.

Figure 27:
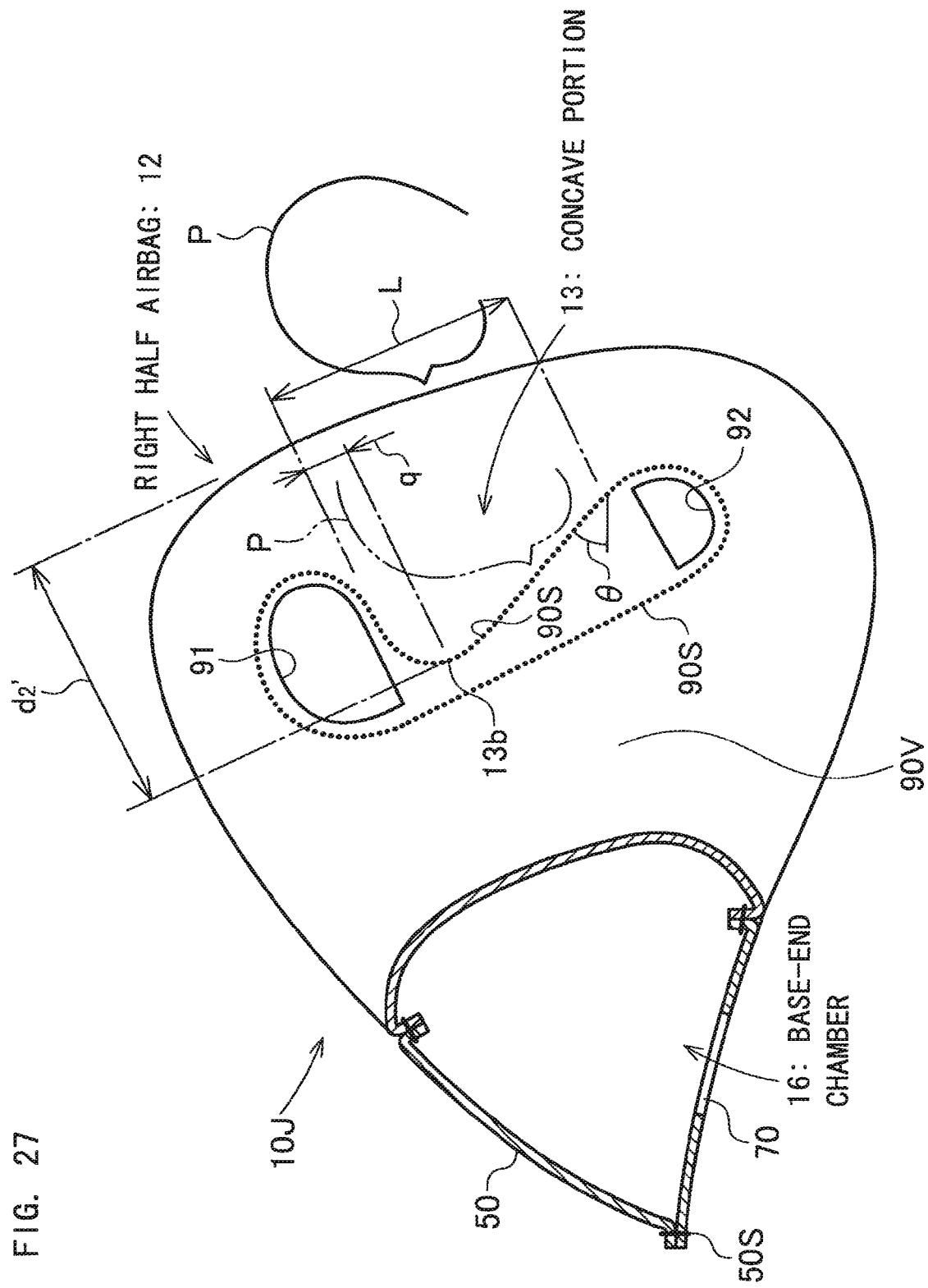
FIG. 27 is a vertical cross-sectional view in the front-back direction of the airbag in an inflated state according to an embodiment of the present invention.

Note that in FIGS. 3 and 7, the seam 90S curves from the vicinity of the upper end to the vicinity of the lower end of the range L, forming an overall convex, substantially arced shape toward the vehicle front. With this arrangement, the concave portion 13 is deepest in the intermediate part, and gradually decreases in depth upward and downward from the intermediate part. Note that the shape of the seam 90S and the position of the deepest part of the concave portion 13 are not limited thereto. For example, the seam 90S may extend into a substantial "L" shape, a substantial "7" shape (FIGS. 3 and 5 show a substantial "7" shape flipped horizontally), or the like. Further, the concave portion 13 may form a shape that suddenly deepens on the lower side of the upper part of the concave portion 13 (that is, in the vicinity of the upper end of the range L), and gradually decreasing in depth from that position toward the lower side, i.e., a shape in which the concave portion 13 deepens to the extent of the upper side in the intermediate part. The seam 90S does not need to be provided continuously across the upper part, intermediate part, and lower part of the concave portion 13. That is, for example, the seam 90S may be discontinuous between the upper part and intermediate part and/or between the intermediate part and lower part of the concave portion 13. Further, in the intermediate part of the concave portion 13, the seam 90S does not necessarily have to curve away from the surface facing the occupant. As long as the depth of the intermediate part of the concave portion 13 is deeper than the depths of the upper part and lower part of the concave portion 13, it is sufficient. That is, in the above intermediate part, the seam 90S may curve so that at least a part comes close to the surface facing the occupant. Further, the seam 90S may extend linearly. One example of an airbag thus configured is shown in FIGS. 27 and 29, which will be described later in detail.

According to this embodiment, connecting bands 93 and 94 that extend in the horizontal direction of the airbag 10 are provided near the vertical middle and the front-back middle of the right half airbag 12 and the left half airbag 14, respectively. These connecting bands 93 and 94 restrict the lateral widths of the right half airbag 12 and the left half airbag 14 at the time of inflation. With this arrangement, the front end portions closer to the occupant of each of the bags 12 and 14 further protrude in the direction of the occupant, further deepening the concave portion 13. Further, since the distance W between the front end 12t of the right half airbag 12 and the front end 14t of the left half airbag 14 is restricted, the ribs of the occupant are reliably restrained by these airbags 12 and 14, minimizing the load on the breastbone.

A vent hole 18 is provided on the outer surfaces of the right half airbag 12 and the left half airbag 14, i.e., on a right outer surface 40 and a left outer surface 30.

The panel configuration of this airbag 10 will now be described with reference to FIG. 8 to FIG. 11. FIG. 10 and FIG. 11 are exploded perspective views of each panel of the airbag 10.

The outer shell of the airbag 10 comprises an inside panel 20 and an outside panel 80.

The inside panel 20 is a substantially long guitar-shaped panel. The inside panel 20, as shown in FIGS. 10 and 11, is folded at the center into a right side 20R and a left side 20L. The right side 20R forms an inner surface of the right half airbag 12, and the left side 20L forms an inner surface of the left half airbag 14. A periphery of the inside panel 20 is formed from the left side 20L having a lower side 28, a front-end side 21, an upper side 22, and an upper side 23 in the vicinity of a folded portion, and the right side 20R having an upper side 24, a front-end side 25, a lower side 26, and a lower side 27 in the vicinity of the folded portion.

As shown in FIG. 9 to FIG. 11, an outside panel 80 comprises the right outer surface 40 that forms an outer surface of the right half airbag 12, the left outer surface 30 that forms an outer surface of the left half airbag 14, and a mouth surface 50 that forms the base-end chamber 16.

The side edges of the outer periphery of the left outer surface 30 and the right outer surface 40 are formed by front-end sides 31 and 41, upper sides 32 and 42, and lower side 34 and 44.

The mouth surface 50 has a left-side surface 50A, a bottom 50B, a right-side surface 50C, a left flap 50D forming an upper left side, and a right flap 50E forming an upper right side. The base end of the left outer surface 30 continues to the left side surface 50A, and the base end of the right outer surface 40 continues to the right side surface 50C. The mouth surface 50 is folded to make the side surfaces 50A and 50C substantially triangular and is open to the front end of the airbag.

A periphery of the mouth surface 50 is formed from face-to-face sides 51 and 52 of the substantially rectangular flaps 50D and 50E, respective rear sides (flap rear sides) 53 and 54 of the flaps 50D and 50E, respective front sides 55 and 56 of the flaps 50D and 50E, a front side 57 facing the front sides 55 and 56, and a rear side (bottom rear side) 60 of the bottom 50B.

The above flap rear sides 53 and 54 are respectively connected to the upper sides 32 and 42 of the left outer surface 30 and the right outer surface 40. Both end sides of the bottom rear side 60 are respectively connected to the lower sides 34 and 44 of the left outer surface 30 and the right outer surface 40.

The opening 91 for communicating the interiors of the left half airbag 14 and the right half airbag 12 with each other is provided on each of the upper parts of the left side 20L, and the right side 20R of the inside panel 20. Additionally, the opening 92 for communicating the interiors of the left half airbag 14 and the right half airbag 12 with each other is provided on each of the lower parts of the left side 20L and the right side 20R.

The base ends of the connecting bands 94 are stitched together by a seam 94S between the openings 91 and 92 of the left side 20L, and between the openings 91 and 92 of the right side 20R.

The base ends of the connecting bands 93 are stitched by a seam 93S at a position facing the base band 94 of the outside panel 80.

Note that in FIGS. 10 and 11 the base bands 93 and 94 have been omitted for clarity of illustration.

A mouth 70, which is an opening for introducing gas from an inflator 115 (refer to FIG. 7), is provided at the lateral center part of the outside panel 80.

To manufacture this airbag 10, as shown in FIGS. 10 and 11, first the face-to-face sides 51 and 52 of the flaps 50D and 50E of the mouth surface 50 are stitched together. Reference numeral 51S of FIG. 11 denotes this stitched seam.

Next, the inside panel 20 is folded into two so that the left side 20L and the right side 20R of the inside panel 20 overlap. Subsequently, both sides 20L and 20R are stitched together by the seam 90S that wraps around the openings 91 and 92. Subsequently, the left outer surface 30 of the outside panel 80 and the left side 20L of the inside panel 20 are faced to each other. In this face-to-face state, the front-end sides 21 and 31, the upper sides 22 and 32, and the lower sides 28 and 34 are stitched together, respectively. The right outer surface 40 of the outside panel 80 and the right side 20R of the inside panel 20 are then faced. In this face-to-face state, the front-end sides 25 and 41, the upper sides 24 and 42, and the lower sides 26 and 44 are stitched together, respectively. The flap rear sides 53 and 54 of the mouth surface 50 of the outside panel 80 are stitched on the upper side 23 in the folded portion of the inside panel 20. The bottom rear side 60 of the mouth surface 50 and the lower side 27 in the folded portion are stitched together. Subsequently, the front ends of the connecting bands 93 and 94 are stitched together by a seam 95S (refer to FIGS. 2 and 5).

As a result of this stitching, the airbag 10 (refer to FIG. 1) is in a reversed state, i.e., a state in which the seam allowances are exposed on the surface of the airbag. As shown in FIG. 1, the flap front sides 55 and 56 of the mouth surface 50 and the front side 57 are not yet stitched together, and instead form an opening M in this state.

Then, the airbag is turned inside out through the opening M. Subsequently, the opening M is stitched by a seam 50S (refer to FIGS. 1 and 2) to form the airbag 10 of FIG. 1.

As shown in FIG. 2, the bottom 508 of the base-end chamber 16 has the opening (mouth) 70 for gas introduction from the inflator 115 (refer to FIG. 7).

The airbag 10 has an outer shell formed by the two panels 20 and 80, making stitching easy.

The airbag 10 is mounted to a front-passenger airbag device for restraining a front-passenger seat occupant of a vehicle in the event of a vehicle collision.

As shown in FIG. 7, the front-passenger seat airbag device comprises a case (container) 114 disposed on the top surface of an instrument panel 110, for housing the airbag 10, the inflator 115 for inflating the airbag 10, and the like. The inflator 115 is disposed in the case 114. The airbag 10 is housed in the case 114 in a folded condition. Then, a lid is mounted to the case to cover the folded airbag 10. The lid is torn and opened by a pressure from the airbag 10 when the airbag 10 is inflated. Reference numeral 120 of FIG. 7 denotes a windshield.

The operation of this airbag device will now be described. When a vehicle equipped with this airbag device is involved in a collision, the inflator 115 is activated to eject gas. The gas from the inflator 115 first inflates the base-end chamber 16 and then flows into the right half airbag 12 and the left half airbag 14 to inflate them.

In the airbag 10, the base-end chamber 16 that was first inflated contacts the upper surface of the instrument panel 110 to become stable in position. As a result, the right half airbag 12 and the left half airbag 14 are stable in position not only after the inflation but also during the inflation.

The gas is supplied from the inflated base-end chamber 16 to the right half airbag 12 and the left half airbag 14 substantially equally. The front ends of the right half airbag 12 and the left half airbag 14 communicate with each other via the openings 91 and 92. Therefore, both the right half airbag 12 and the left half airbag 14 are inflated smoothly and substantially symmetrically from the early stage of inflation. When the openings 91 and 92 are not provided, for example, the inner pressure of the right half airbag 12 and the inner pressure of the left half airbag 14 become uneven, causing the inflation of the right half airbag 12 and the inflation of the left half airbag 14 to be uneven. This may potentially lead to unstable deployment behavior of the airbag 10. Nevertheless, with the openings 91 and 92 provided as described above, uneven deployment of the right half airbag 10 and the left half airbag 14 is suppressed, thereby suppressing any sudden horizontal oscillation or neck swings during inflation.

When the airbag 10 is fully inflated, the vertically extended concave portion 13 is formed at the lateral center of the surface facing the occupant. That is, the vertically extended valley-shaped concave portion 13 is formed between the front ends of the right half airbag 12 and the left half airbag 14 to face the occupant.

When the occupant is seated in the lateral center of the front-passenger seat, the inflated right half airbag 12 receives the right side of the thorax of the occupant, the inflated left half airbag 14 receives the left side of the thorax, and the concave portion 13 faces the vicinity of the breastbone. Therefore, the reaction force applied near the breastbone during reception of the airbag is small. The head portion enters and is received by the concave portion 13.

With this airbag 10, the depth $d_2$ of the intermediate part of the concave portion 13 is deeper than the depth $d_1$ of the upper part and the depth $d_3$ of the lower part. When a small occupant of about the FMVSS AF05 percentile is seated in the front-passenger seat and a frontal collision occurs, the head portion of this small occupant is received by the concave portion 13 having a deep intermediate part. The left side and right side of the thorax and the shoulder area of the occupant are received by the lower parts of the right half airbag 12 and the left half airbag 14 as described above. The mass of a small occupant is low. As a result, when a seatbelt is worn, the restraining force of the shoulder webbings of the seatbelt takes effect, resulting in a relatively low forward moving velocity of the thorax of the small occupant. The head portion of the small occupant moves forward at a relatively high velocity compared to the thorax. This head portion enters the vicinity of the intermediate part of the concave portion 13, and is sandwiched by the right half airbag 12 and the left half airbag 14 from both sides. As a result, the forward moving velocity of the head portion does not suddenly decrease, making it possible for the thorax and head portion to move forward and press into the airbag 10 while behaving in substantially the same manner. With this arrangement, the impact applied to the neck of the small occupant is minimized.

Further, when the tangential direction T of the inmost part of the concave portion 13 is inclined forward, the face of the small occupant of about the AF05 percentile substantially matches the tangential direction T upon reaching the inmost part. As a result, the load on the neck of the occupant is minimized.

When a large occupant of about the FMVSS AM5 percentile (an average frame of an American male adult) is seated in the lateral center of the front-passenger seat and a frontal collision occurs, the head portion of the occupant is received by the upper part of the surface of the airbag 10 facing the occupant. Additionally, the thorax and shoulders of the occupant are received by the intermediate part of the airbag 10. The large occupant has high mass, and therefore moves forward with a greater amount of energy than the small occupant. In the upper part of the airbag 10, the concave portion 13 is shallow, causing the head portion to enter the concave portion 13 at substantially the same time as the left and right sides of the thorax and the shoulders of the occupant contact the right half airbag 12 and the left half airbag 14. Then, the head portion, thorax, and shoulders move forward while pressing into the airbag 10 as one. Since the concave portion 13 of the upper part of the airbag 10 is shallow, the front-back stroke of the airbag 10 required to restrain the head portion is maintained and, as a result, the impact applied to the large occupant is absorbed.

When an occupant seated in the front-passenger seat is seated toward the left, the occupant hits and presses into the left half airbag 14. As a result, the gas pressure inside the left half airbag 14, i.e., the left chamber, rises and the occupant is received by the left half airbag 14. The left half airbag 14 and the right half airbag 12 are separated by the inside panel 20, making the gas pressure inside the left chamber high compared to an airbag in which the left and right chambers are not separated. The gas inside this left chamber flows from the vent hole 18 to outside the airbag 10, or through the openings 91 and 92 and the base-end chamber 16 to the right chamber, thereby absorbing the impact.

When the occupant is seated toward the right, the occupant is received by the right half airbag 12. Then, the gas inside this right half airbag 12 flows from the vent hole 18 to outside the airbag 10, or through the openings 91 and 92 and the base-end chamber 16 to the left chamber, thereby absorbing the impact.

Figure 15:
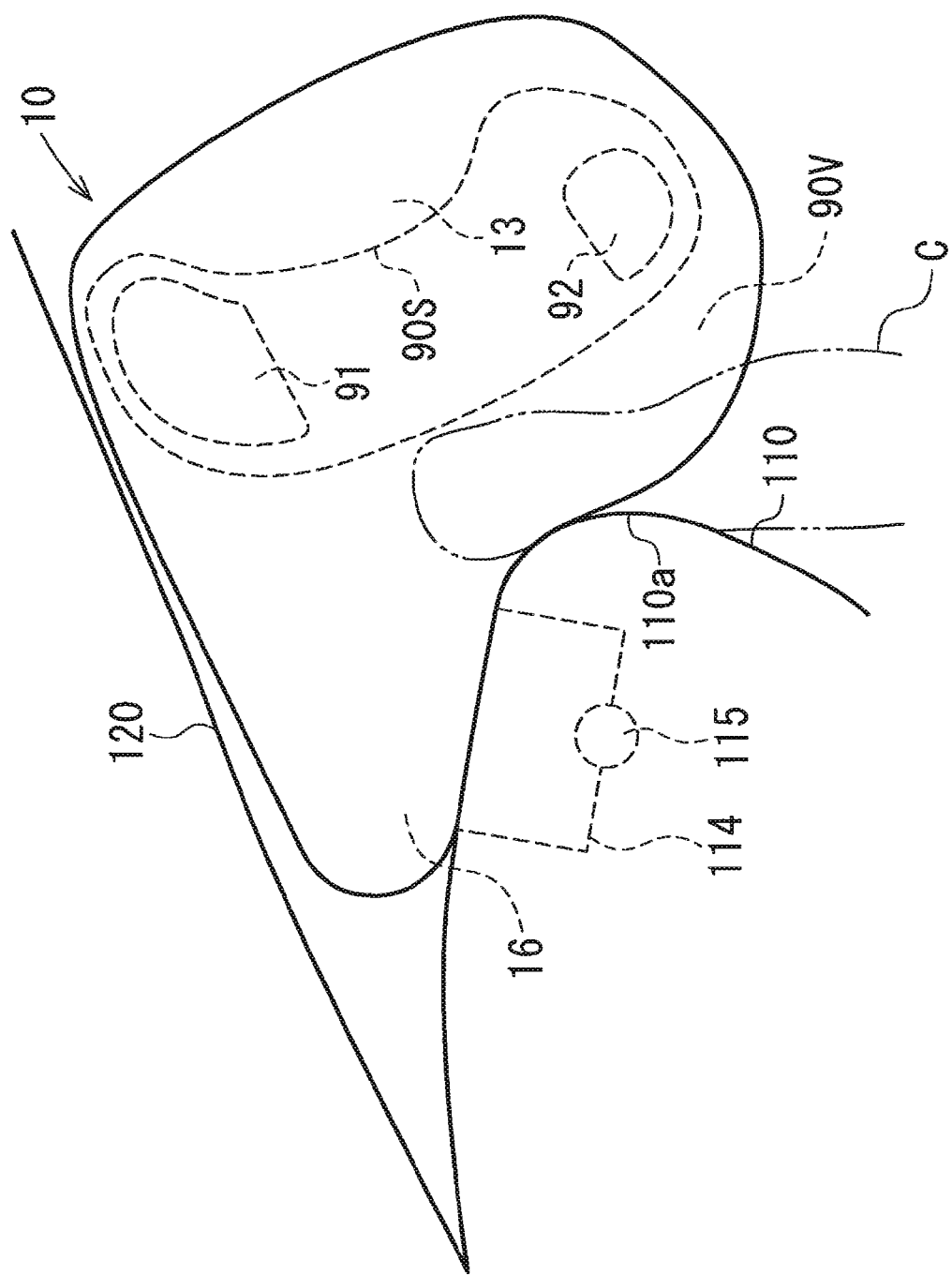
FIG. 15 is a side view of the airbag shown in FIG. 1 in an inflated state.

In this embodiment, as shown in FIG. 3, there exists a hollow portion 90V that passes vertically through the right half airbag 12 and the left half airbag 14 between the seam 90S and the base-end chamber 16. The hollow portion 90V is formed so that, when the airbag 10 is in a fully inflated state, at least one portion of the lower end of the hollow portion 90V is positioned closer to the vehicle rear than a rear end portion 110a of the instrument panel 110. That is, with the airbag 10 in a fully inflated state, at least one portion of the opening on the lower end of the hollow portion 90V is exposed on the lower surface of the airbag 10, closer to the vehicle rear than the rear end portion 110a of the instrument panel 110. Therefore, as shown in FIG. 15, even if an object C is present in the vicinity of the instrument panel 110 when the airbag 10 inflates, the object C is engulfed by the hollow portion 90V.

While the right half airbag 12 and the left half airbag 14 have a plane-symmetrical shape in the above embodiment, a plane-asymmetrical shape is also acceptable. Further, the capacity of the right half airbag 12 and the capacity of the left half airbag 14 may be the same or different.

Figure 16:
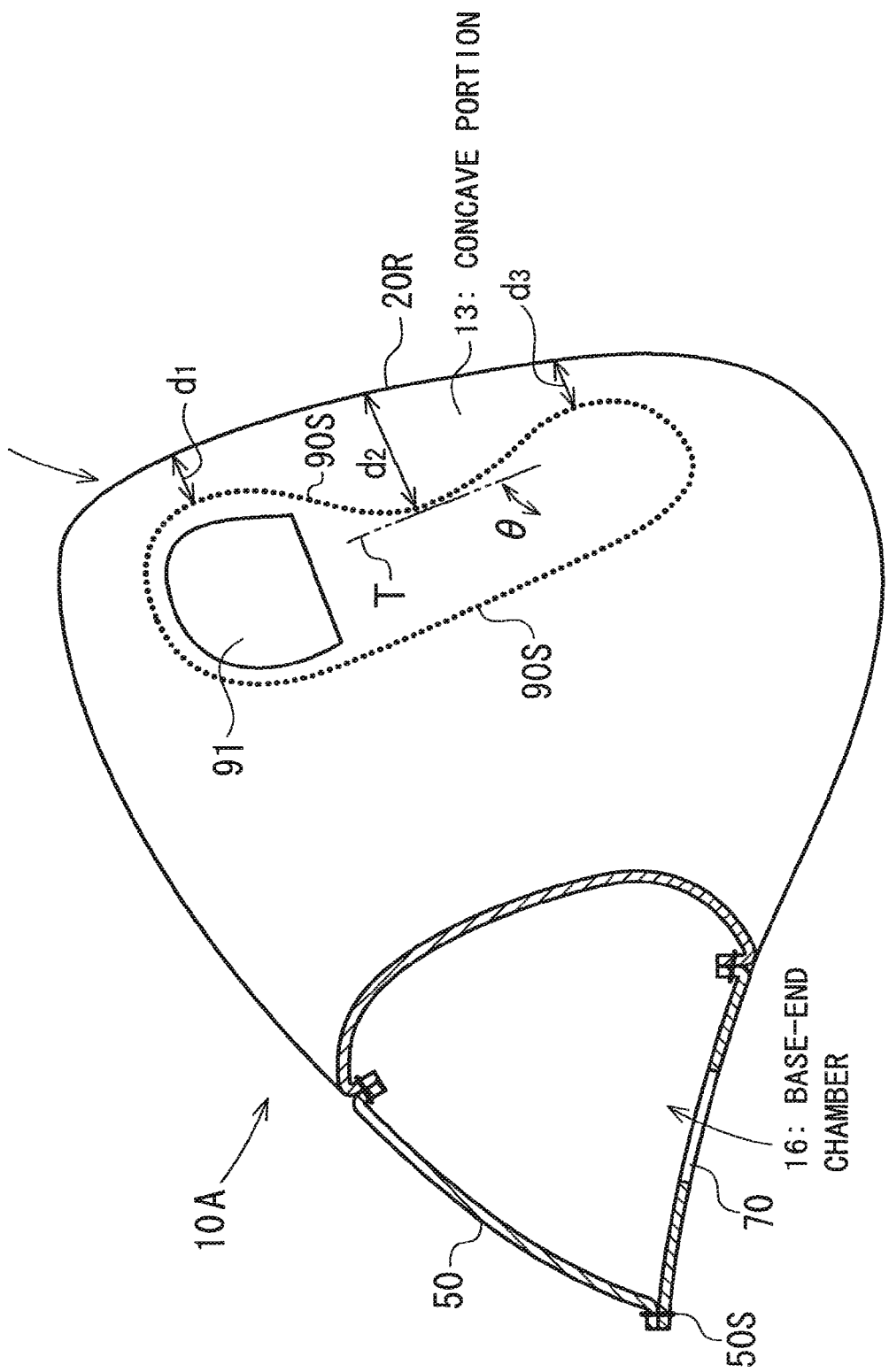
FIG. 16 is a vertical cross-sectional view of the airbag according to an embodiment of the present invention.

While the two openings 91 and 92 are provided in the above embodiment, provision of only the first opening 91 of the upper part as shown in an airbag 10A of FIG. 16 is also possible. Further, two or more first openings may be provided in the upper part. In such a case, the total opening area of each of the first openings is best within the preferable opening area range of the above-described first opening 91.

Figure 18:
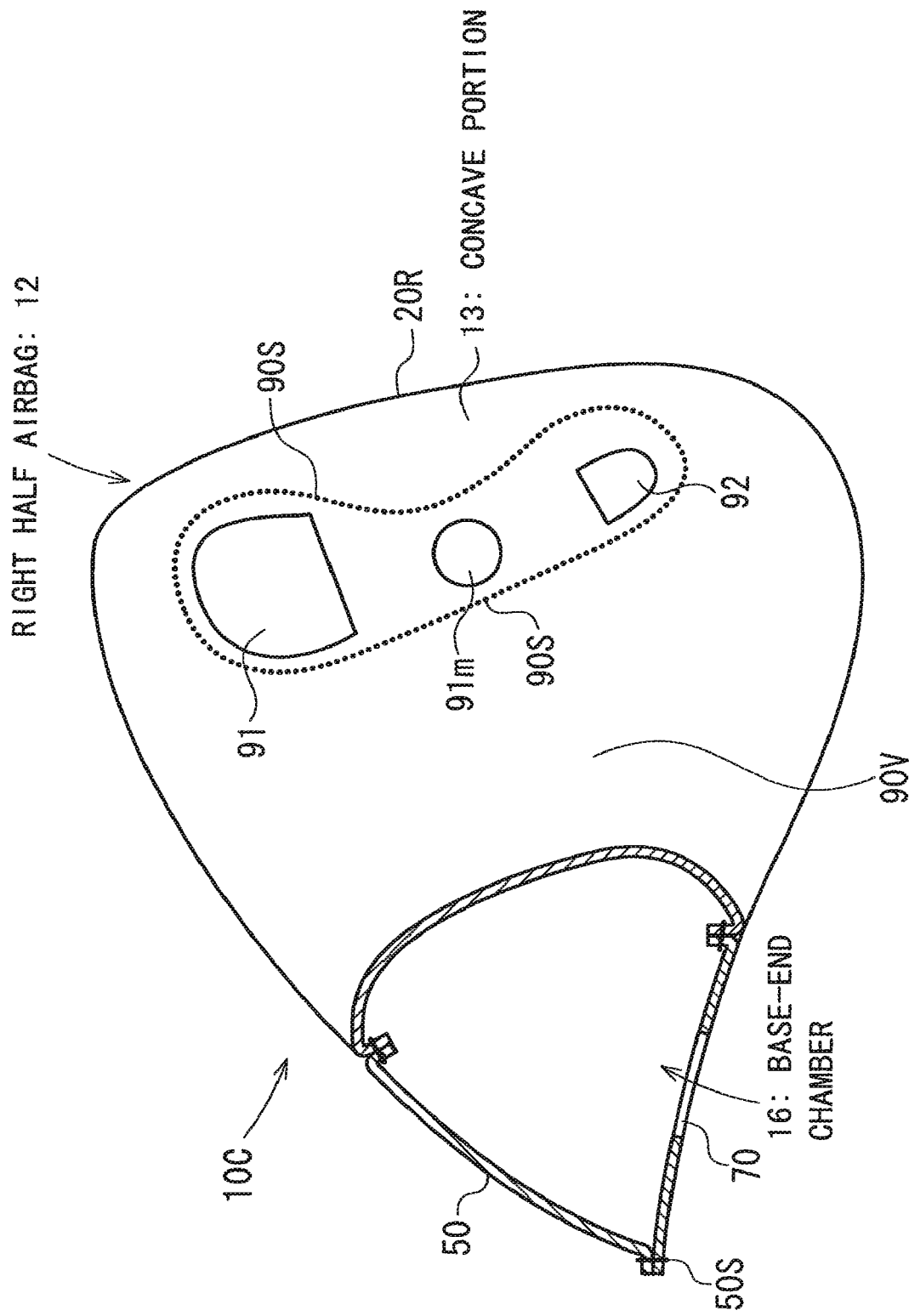
FIG. 18 is a vertical cross-sectional view of the airbag according to an embodiment of the present invention.

FIG. 18 illustrates an airbag of an embodiment in which three openings are provided. FIG. 18 is a vertical cross-sectional view of the same part as FIG. 3 of an airbag 10C provided with an intermediate part opening 91m between the upper part opening 91 and the lower part opening 92.

In the above embodiment, the concave portion 13 is deepest in the intermediate part. Nevertheless, as in a concave portion 13B of the airbag 10B of FIG. 17, the concave portion 13B may have substantially equal depths in the upper part, intermediate part, and lower part. Additionally, although not shown, the depths of the upper and lower parts may be greater than the depth of the intermediate part.

Figure 17:
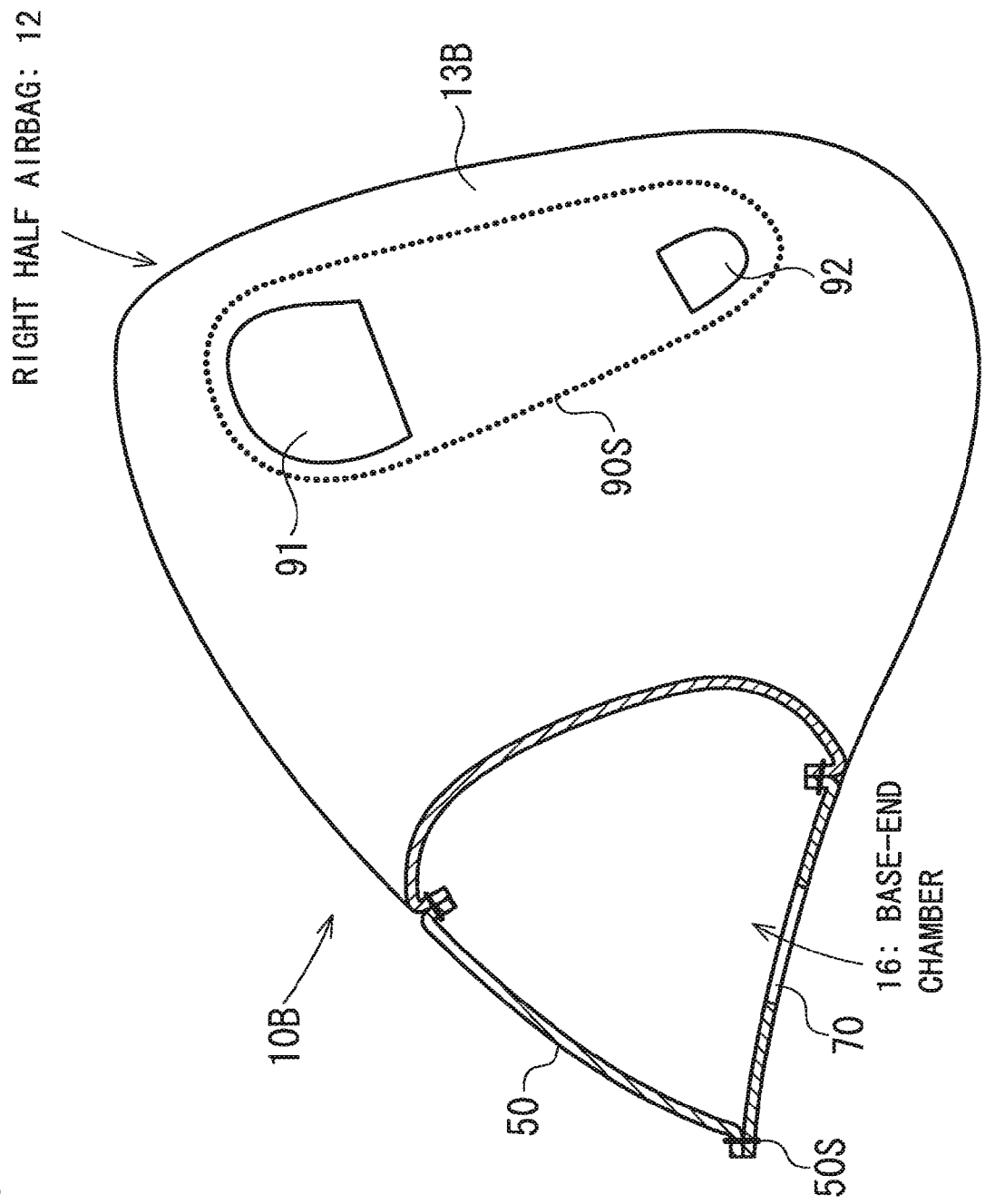
FIG. 17 is a vertical cross-sectional view of the airbag according to an embodiment of the present invention.

Other arrangements in FIG. 16 to FIG. 18 are the same as those in FIG. 3, and the same reference numerals denote the same parts.

According to the above embodiment, the openings 91 and 92 are independent and provided separately. Conversely, as in inside panels 20A, 20B, and 20C of FIG. 12 to FIG. 14, the opening 94 having a long narrow shape that connects the openings 91 and 92 may be provided with a small panel that crosses the opening 94.

Figure 12A:
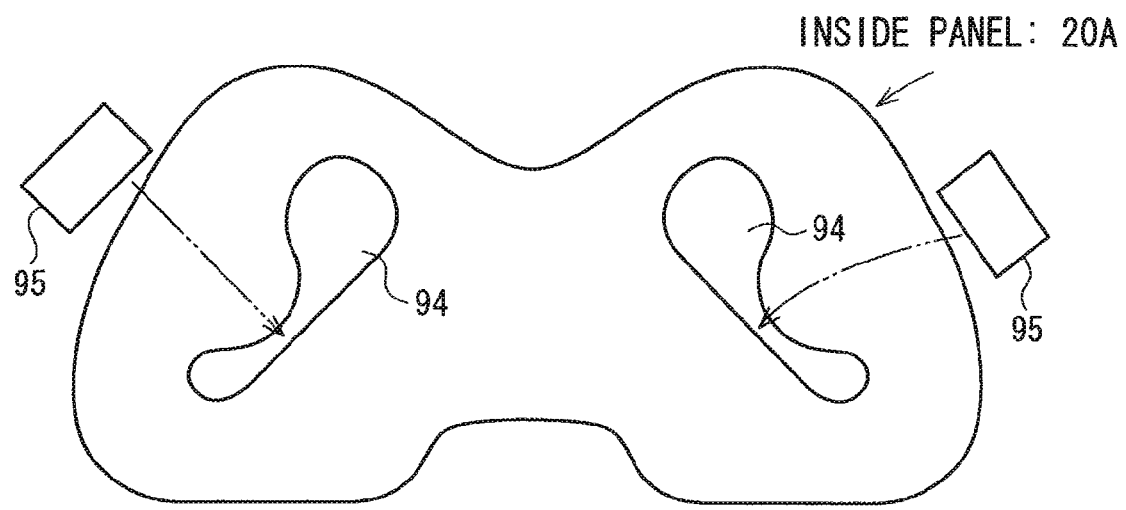
FIG. 12 is a schematic view of the inside panel.
Figure 12B:
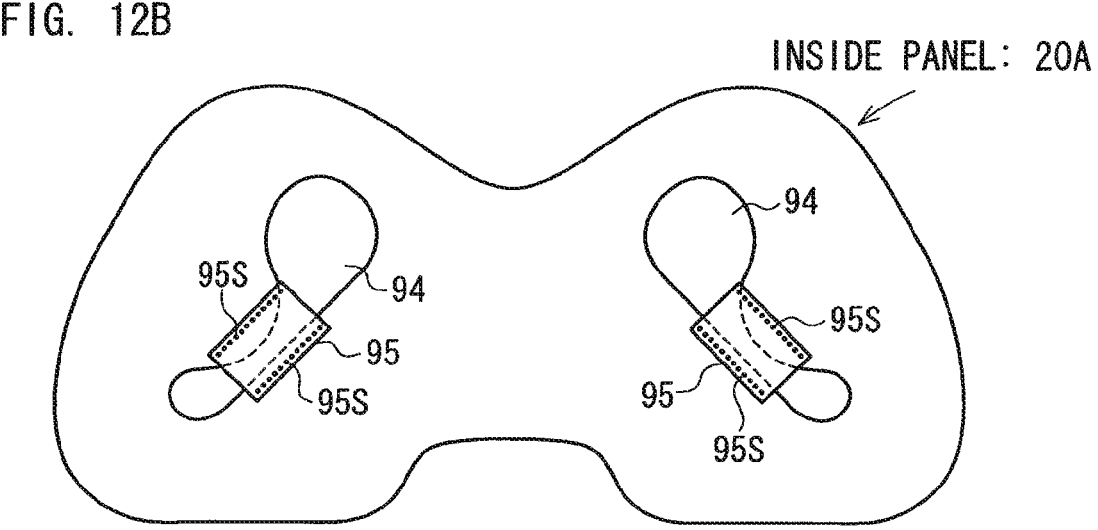

The opening 94 of the inside panel 20A of FIGS. 12A and 12B has a guitar shape with a narrow middle. As shown in FIG. 12B, a small panel 95 crosses the narrow portion of the opening 94. The small panel 95 is stitched to the edges of the opening 94, on the vehicle front and rear sides, by the seam 95S.

Figure 13A:
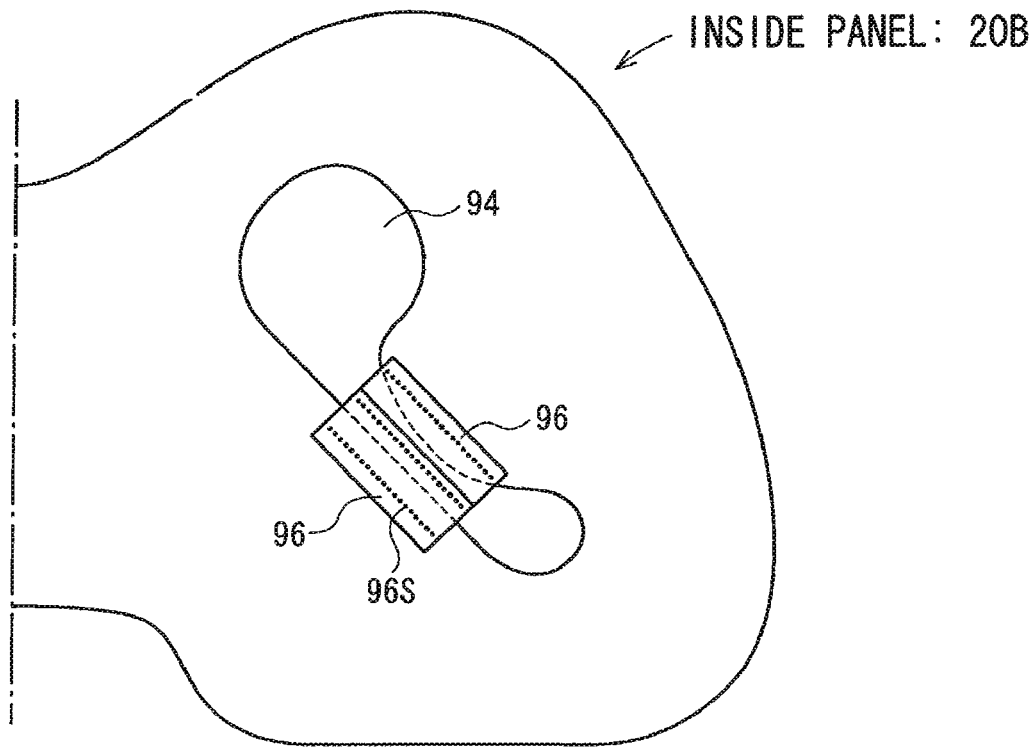
FIG. 13 is a schematic view of the inside panel.
Figure 13B:
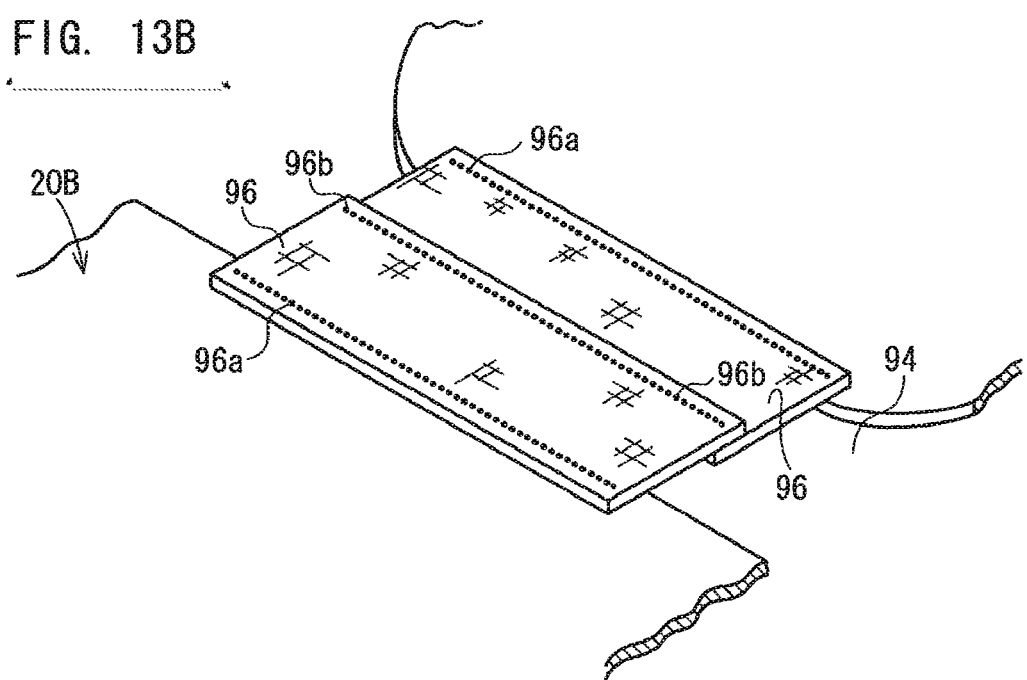

In the inside panel 20B of FIG. 13A, the base-end side of a small panel 96 is stitched to an edge of the narrow portion of the opening 94, on the vehicle front and rear sides, respectively, by a seam 96a. As shown in FIG. 13B, the front end side of one small panel 96 and the front end side of another small panel 96 are stitched together by a seam 96b. That is, a small panel connecting body that connects the small panels 96 and 96 crosses the opening 94.

Figure 14A:
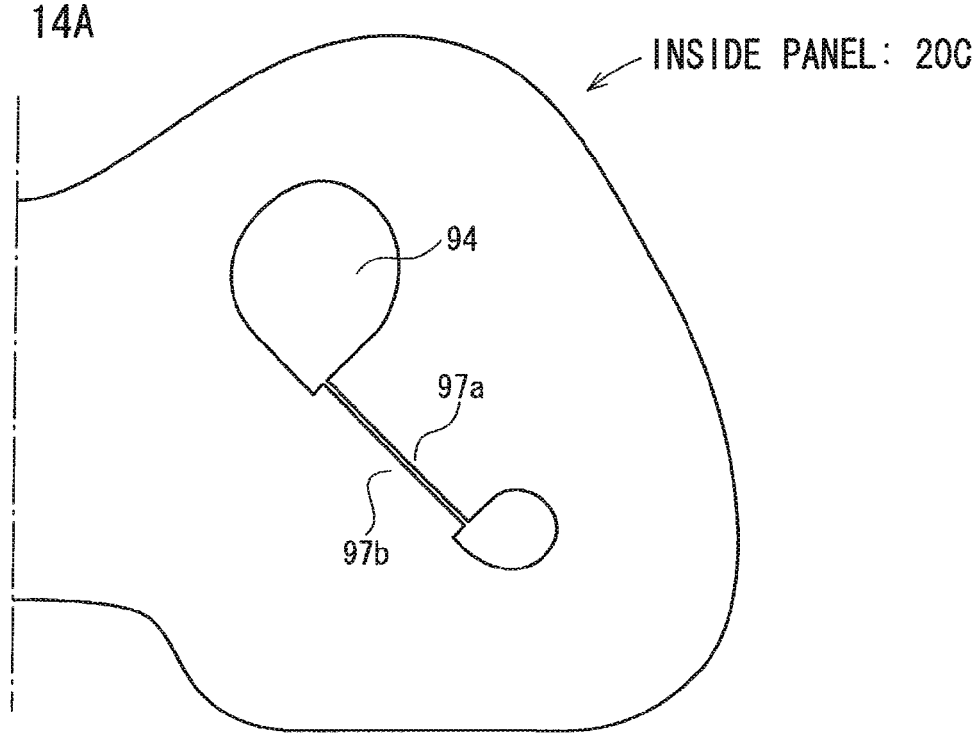
FIG. 14 is a schematic view of the inside panel.
Figure 14B:
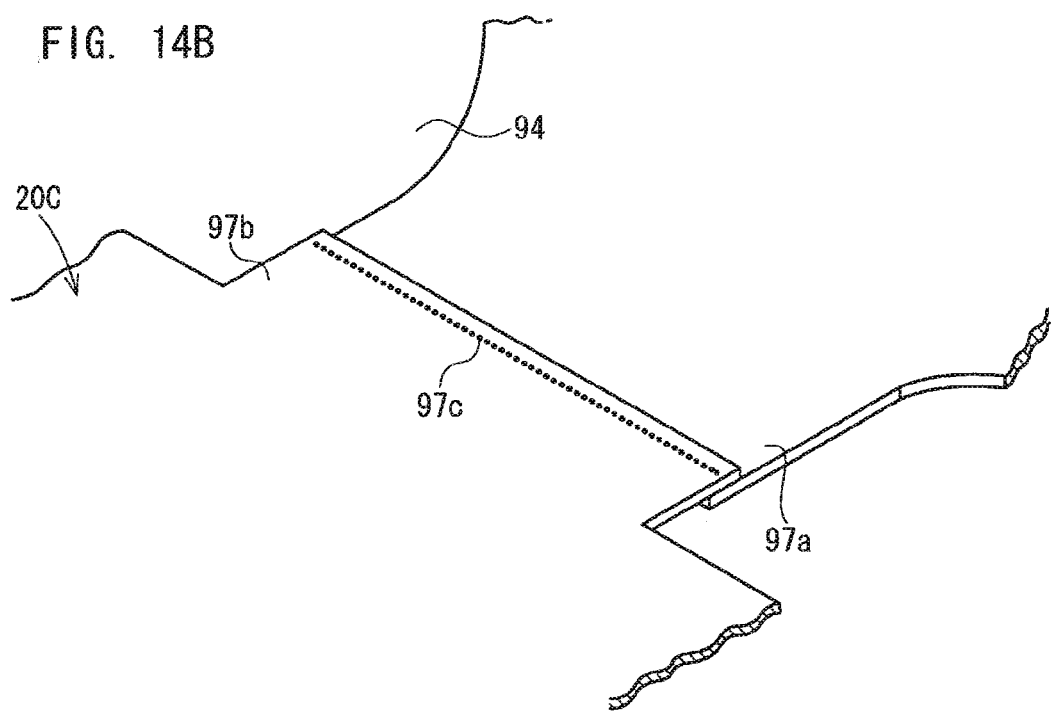

In the inside panel 20C of FIG. 14, small panels 97a and 97b protrude from the edges of the narrow portion of the opening 94, on the vehicle front and rear sides, respectively. The small panels 97a and 97b are provided in an integrated manner with the base fabric of the inside panel 20C. As shown in FIG. 14B, the front ends of the small panel 97a and the small panel 97b are stitched together by a seam 97c. That is, the connected body formed by the small panels 97a and 97b cross the opening 94.

An airbag manufactured using these inside panels 20A to 20C achieves the same advantages as the airbag of the above embodiment. Furthermore, shortening the length in the lateral direction of the opening of the small panel 95, the connecting body of the small panel 96, or the connecting body of the small panel 97 of the inside panels 20A to 20C makes it possible to increase the depth $d_2$ of the intermediate part of the concave portion 13.

Figure 19:
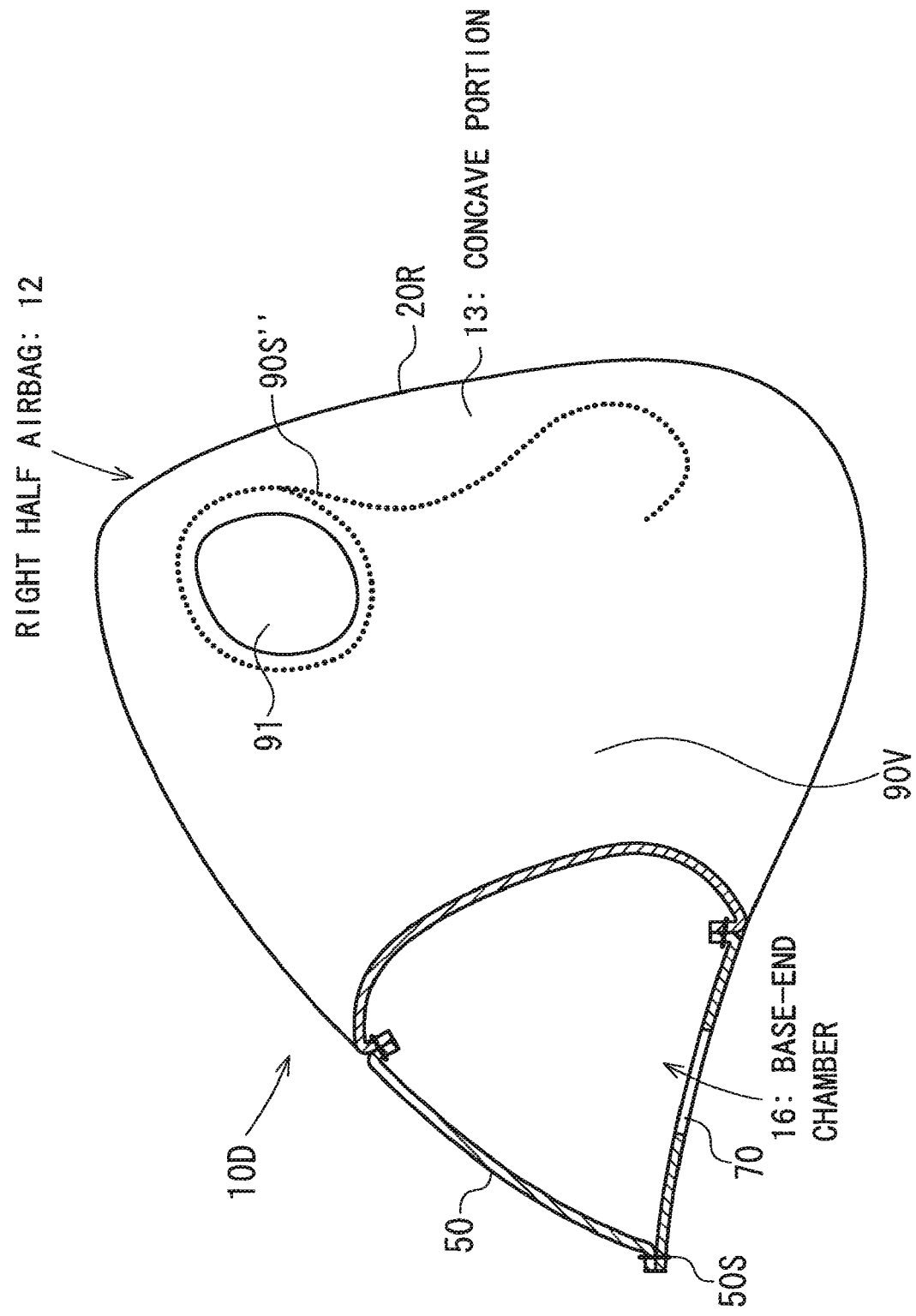
FIG. 19 is a vertical cross-sectional view of the airbag according to an embodiment of the present invention.

While FIG. 16 shows the seam 90S in a closed loop shape, the seam may be interrupted in the middle. FIG. 19 is a vertical cross-sectional view of the same part as FIG. 3 of an airbag according to such an embodiment.

In an airbag 10D of FIG. 19, the upper part opening 91 is provided. A seam 90S" has a portion that wraps around the opening 91 and a portion that extends downward therefrom. The portion that extends downward forms a shape wherein the portion that extends vertically on the vehicle front side from the seam 90S is partially omitted. All other arrangements are the same as those in FIG. 16, and the identical reference numerals denote the same parts.

According to the present invention, on the inner side of the intermediate part of the concave portion 13, the right half airbag 12 and the left half airbag 14 may be configured to be pressed together when the airbag is in an inflated state.

Figure 20:
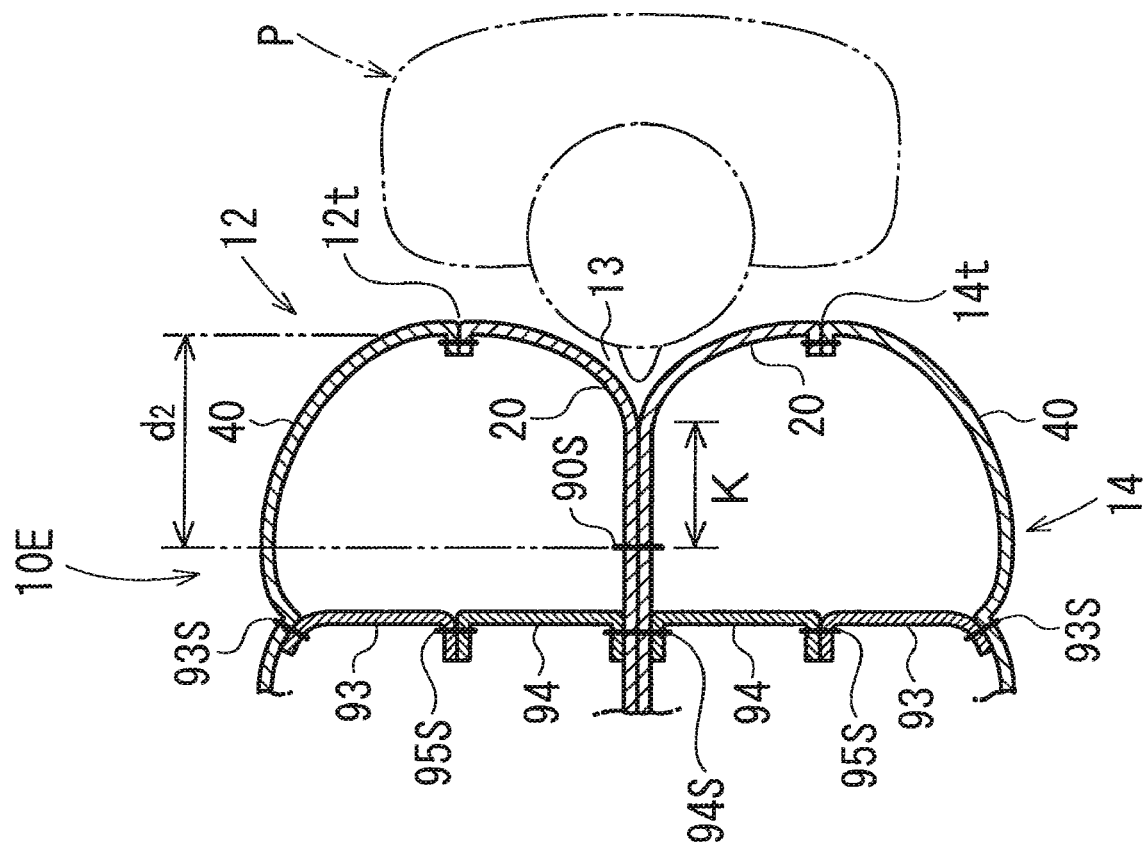
FIG. 20 is a vertical cross-sectional view of the airbag according to an embodiment of the present invention.

FIG. 20 is a cross-sectional view in the substantially horizontal direction of the occupant's side of the inflated state of an airbag 10E of such an embodiment, showing a cross-section of the same part as in FIG. 5.

According to this embodiment, the portion of the seam 90S closer to the occupant is positioned slightly further inward (toward the vehicle front side) in the intermediate part of the concave portion 13 than that shown in FIG. 5. In an inner region K of the intermediate part of the concave portion 13 on the side closer to the occupant than the seam 90S, the inflated right half airbag 12 and left half airbag 14 are pressed together. The head portion of an occupant P enters the inner region K when a frontal collision occurs, and moves forward while pressing apart the right half airbag 12 and the left half airbag 14, causing the impact to be absorbed therebetween.

Figure 21:
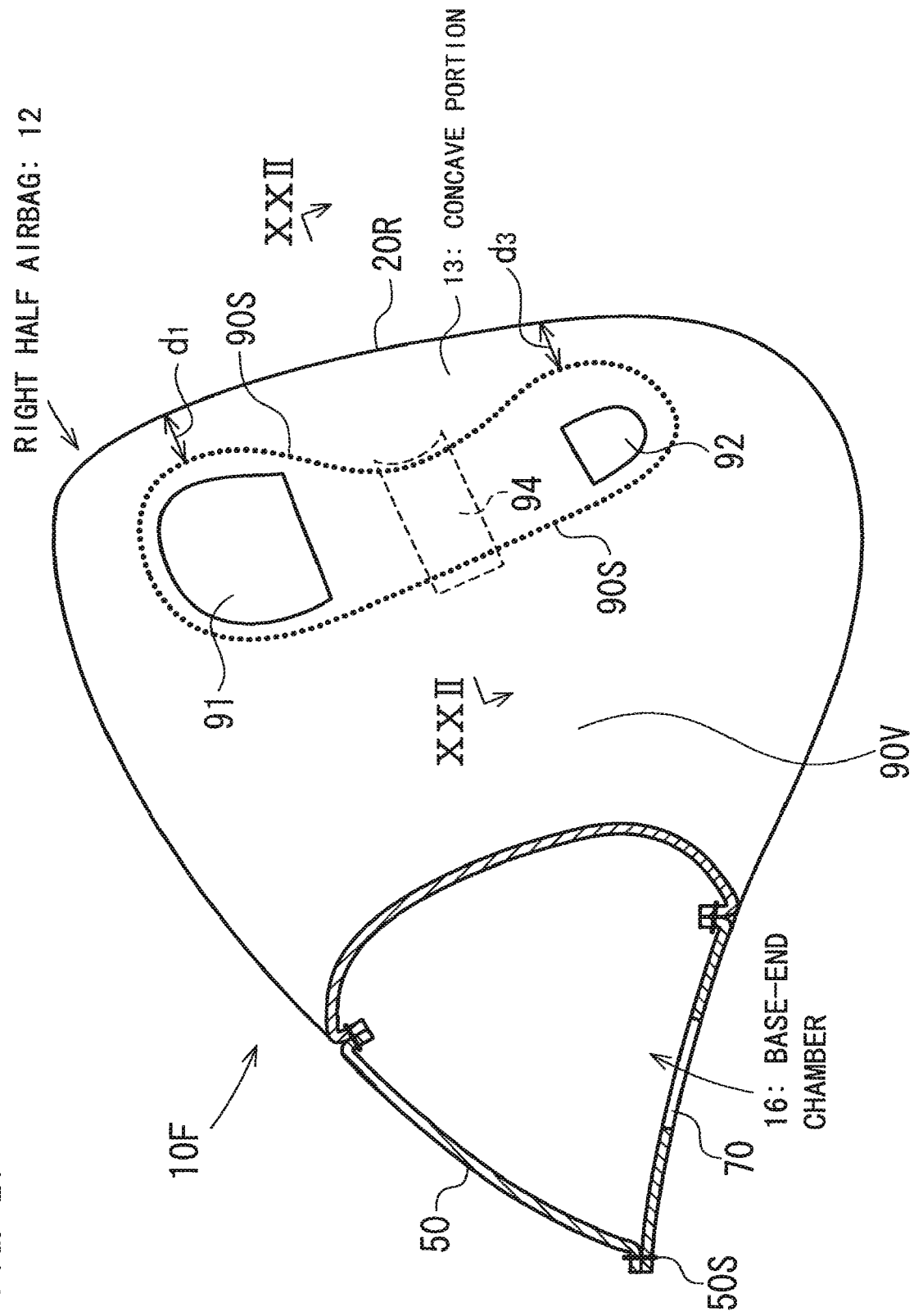
FIG. 21 is a vertical cross-sectional view of the airbag according to an embodiment of the present invention.
Figure 22:
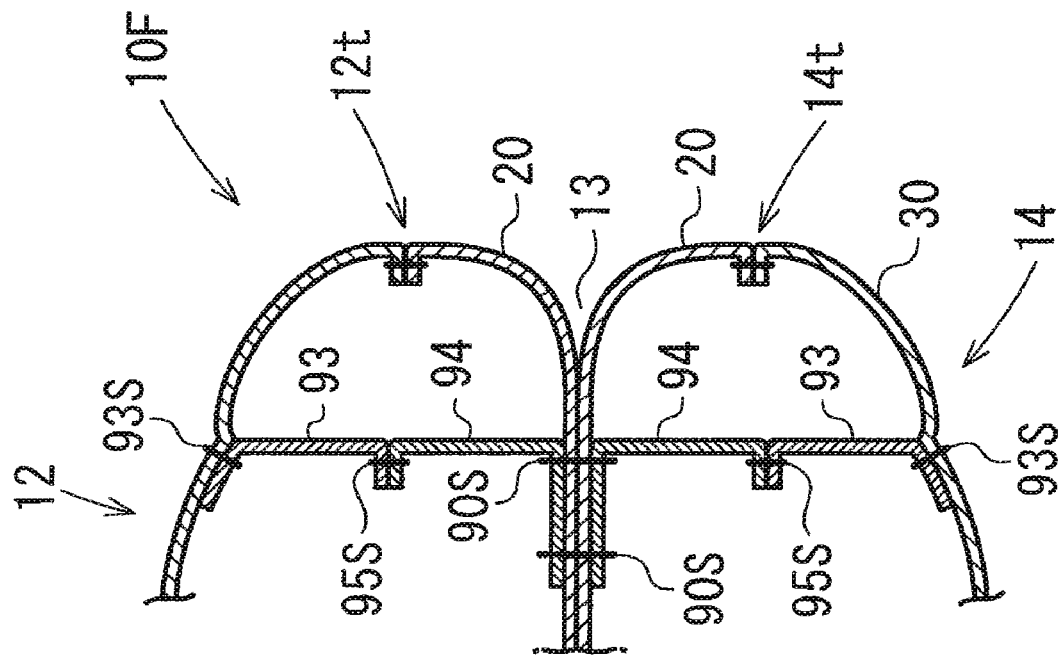
FIG. 22 is a cross-sectional view taken along line XXII-XXII in FIG. 21.

According to the present invention, the connecting band 94 which functions as a tether may be stitched to the right half airbag 12 and the left half airbag 14 by the seam 90S. FIG. 21 is a vertical cross-sectional view of the same part as FIG. 3 of such an airbag 10F. FIG. 22 is a cross-sectional view taken along line XXII-XXII of FIG. 21. In this airbag 10F, the connecting band 94 is stitched to the inside panel 20 by the seam 90S. With the connecting band 94 thus stitched by the seam 90S, the aforementioned seam 94S may be omitted.

Figure 23A:
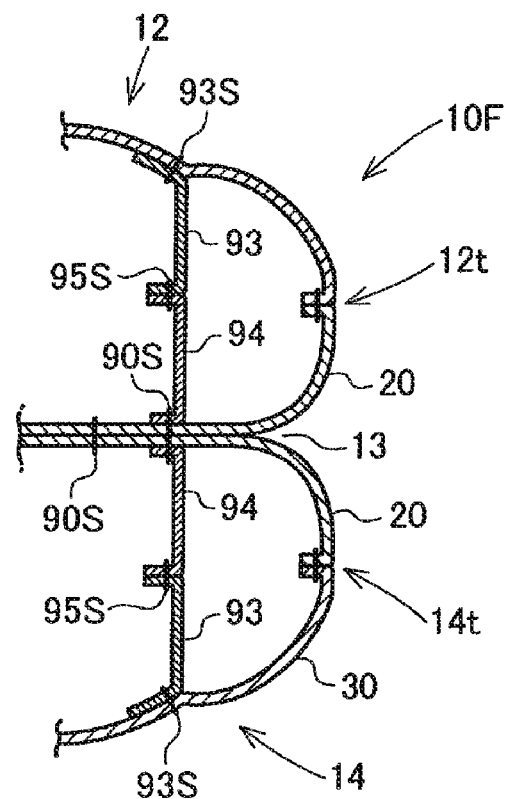
FIG. 23 is a horizontal cross-sectional view of the airbag according to an embodiment of the present invention.
Figure 23B:
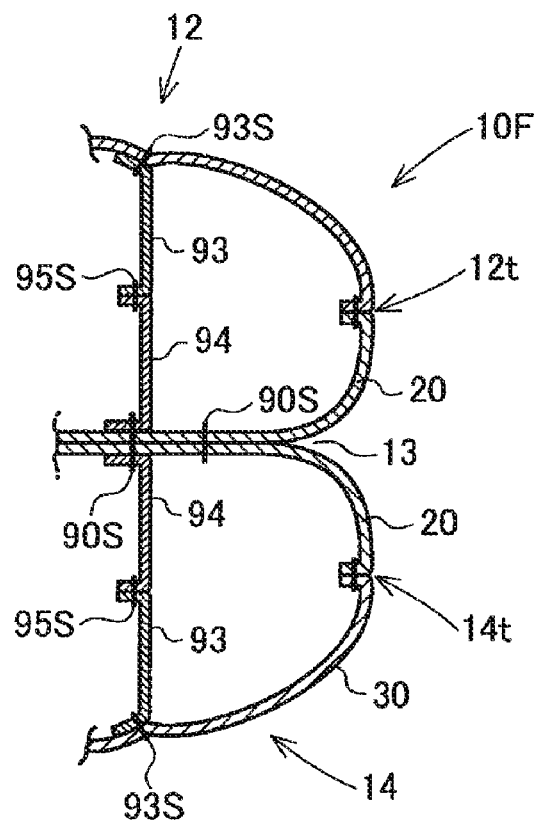

Furthermore, in FIG. 22, the connecting band 94 is stitched to the inside panel 20 by a portion of the seam 90S that extends vertically on the vehicle front side, and by a portion of the seam 90S that extends vertically on the vehicle rear side. Nevertheless, as shown in FIG. 23A, the connecting band 94 may be stitched to the inside panel 20 by only the portion of the seam 90S that extends vertically on the vehicle front side. Or, the connecting band 94 may be connected to the inside panel 20 by only the portion of the seam 90S that extends vertically on the vehicle rear side. FIG. 23A and FIG. 23B respectively show horizontal cross-sectional views of the same part as FIG. 22. All other arrangements in FIG. 23A and FIG. 23B are the same as FIG. 22.

Figure 24:
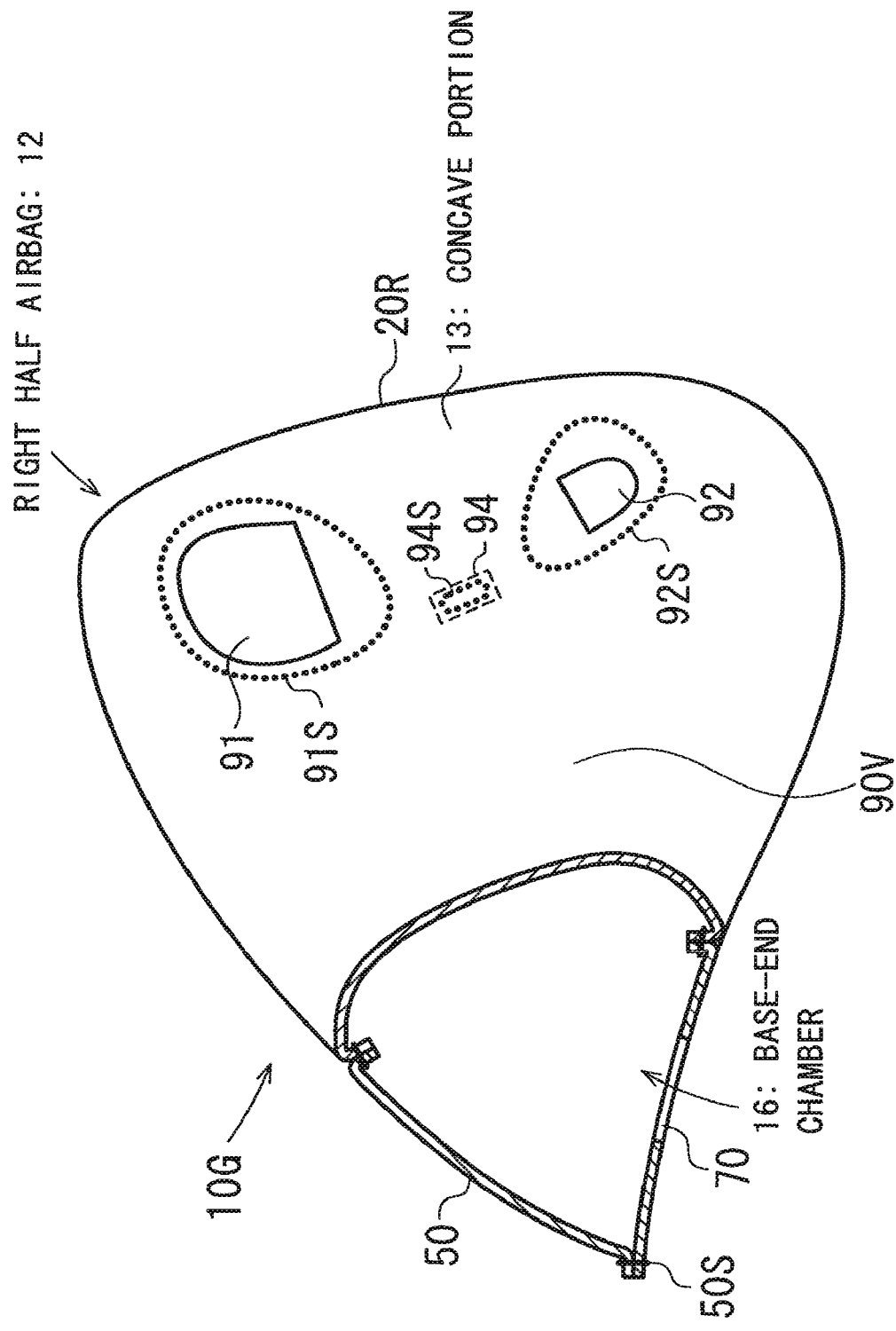
FIG. 24 is a vertical cross-sectional view of the airbag according to an embodiment of the present invention.

According to the present invention, as in an airbag 10G of the FIG. 24, the face-to-face surfaces of the left airbag 14 and the right airbag 12 may be stitched together by a seam 91S serving as an upper part joining means and a seam 92S serving as a lower part joining means, with the seams 91S and 92S discontinuous.

The seam 91S wraps around the opening 91, and the seam 92S wraps around the opening 92.

In the concave portion 13, the intermediate part between the upper seam 91S and the lower seam 92S is a deep concave portion. In this deep concave portion, when the airbag 10G is inflated, the right half airbag 12 and the left half airbag 14 are pressed together. The seam 94S that attaches the connecting band 94 is positioned in this portion thus pressed together. In the intermediate part of the concave portion 13, a portion ends as a result of this seam 94S. Nevertheless, the concave portion 13 reaches the base-end chamber 16 between the seam 94S and the seam 91S, and between the seam 94S and the seam 92S.

When the airbag 10G is inflated, a portion wherein the right half airbag 12 and the left half airbag 14 are pressed together exists from the seam 94S to the surface facing the occupant.

Other arrangements in FIG. 24 are the same as those in FIG. 3, and the same reference numerals denote the same parts.

With this airbag 10G as well, when a small occupant of about the FMVSS AF05 percentile is seated in the front-passenger seat and a frontal collision occurs, the head portion of this small occupant is received by the concave portion 13 having a deep portion between the seams 91 and 92. The left and right sides of the thorax and the shoulder vicinity of the occupant are received by the lower parts of the right half airbag 12 and the left half airbag 14 as described above.

According to this embodiment, the inflated right half airbag 12 and left half airbag 14 are pressed closely together on the side closer to the occupant than the seam 94S. The head portion of the occupant enters this closely pressed portion when a frontal collision occurs, and moves forward while pressing apart the right half airbag 12 and the left half airbag 14, causing the impact to be absorbed therebetween.

When a large occupant of about the FMVSS AM50 percentile (an average frame of an American male adult) is seated in the front-passenger seat and a frontal collision occurs, the head portion of the occupant is received by the upper part of the surface of the airbag 10 facing the occupant, and the thorax and shoulders are received by the intermediate part of the airbag 10G. The large occupant has high mass, and therefore moves forward with a greater amount of energy than the small occupant. In the upper part of the airbag 10G, the concave portion 13 is shallow, causing the head portion to enter the concave portion 13 at substantially the same time as the left and right sides of the thorax and the shoulders of the occupant contact the right half airbag 12 and the left half airbag 14. Then, the head portion, thorax, and shoulders move forward while pressing into the airbag 10 as one. Since the concave portion 13 of the upper part of the airbag 10G is shallow, the front-back stroke of the airbag 10G required to restrain the head portion is maintained so that the impact applied to the large occupant is absorbed.

According to this embodiment as well, as shown in FIG. 15, even if the object C is present in the vicinity of the instrument panel 110 when the airbag 10G inflates, the object C is engulfed by the hollow portion 90V.

In FIG. 24, the seams 91S and 92S circle around the openings 91 and 92. Nevertheless, as in an airbag 10H of FIG. 25, a branch-shaped seam 91S" may extend downward from the seam 91S, and a branch-shaped seam 92S" may extend upward from the seam 92S. The seams 91S" and 92S" may extend to a location near the seam 94S.

Figure 25:
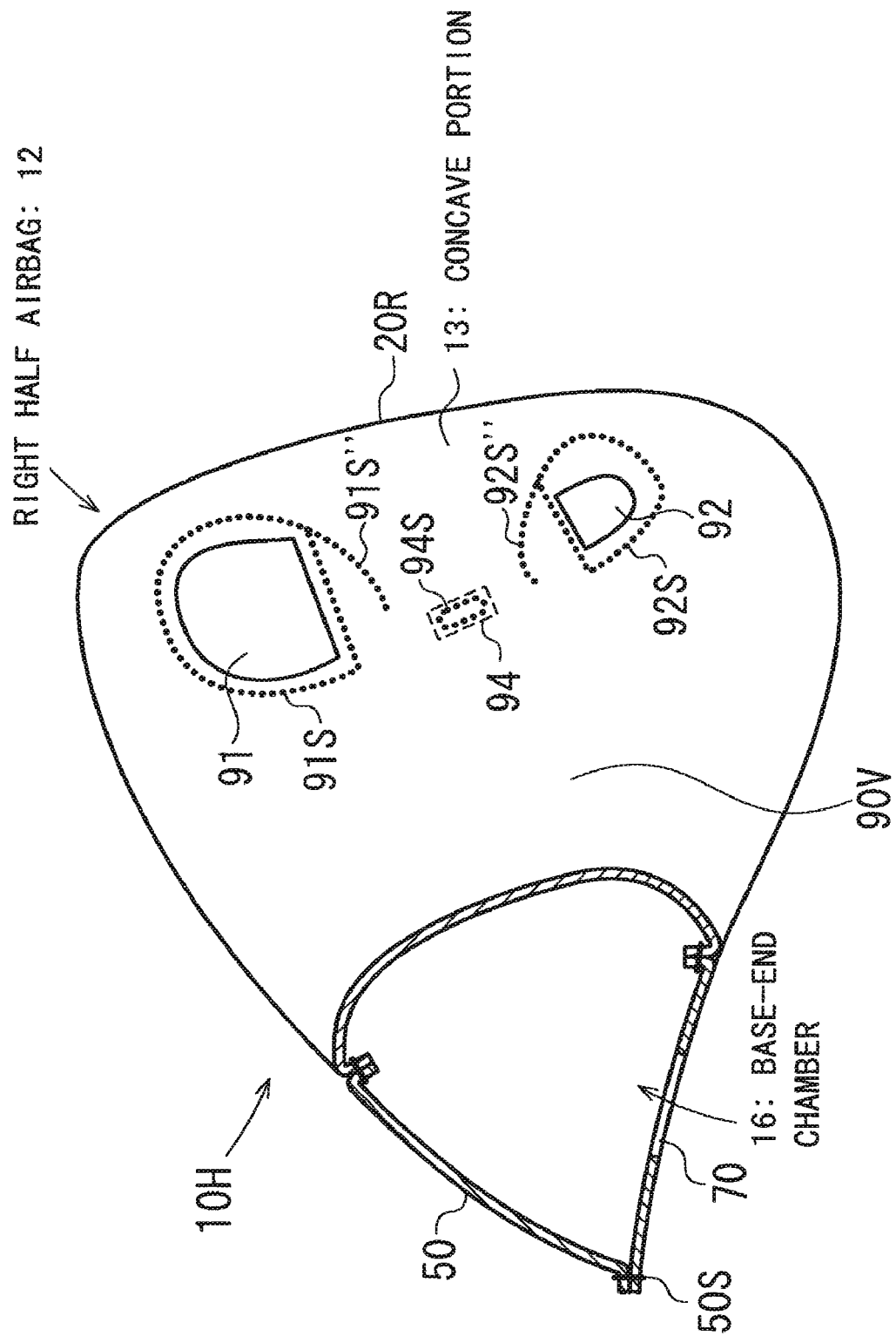
FIG. 25 is a vertical cross-sectional view of the airbag according to an embodiment of the present invention.

Other arrangements in FIG. 25 are the same as those in FIG. 24, and the same reference numerals denote the same parts.

While the two openings 91 and 92 are provided in the embodiment of FIGS. 24 and 25, one or three or more openings may be provided. The opening size may be other than that described above as well. An example of such an embodiment will now be described with reference to FIG. 26.

Figure 26:
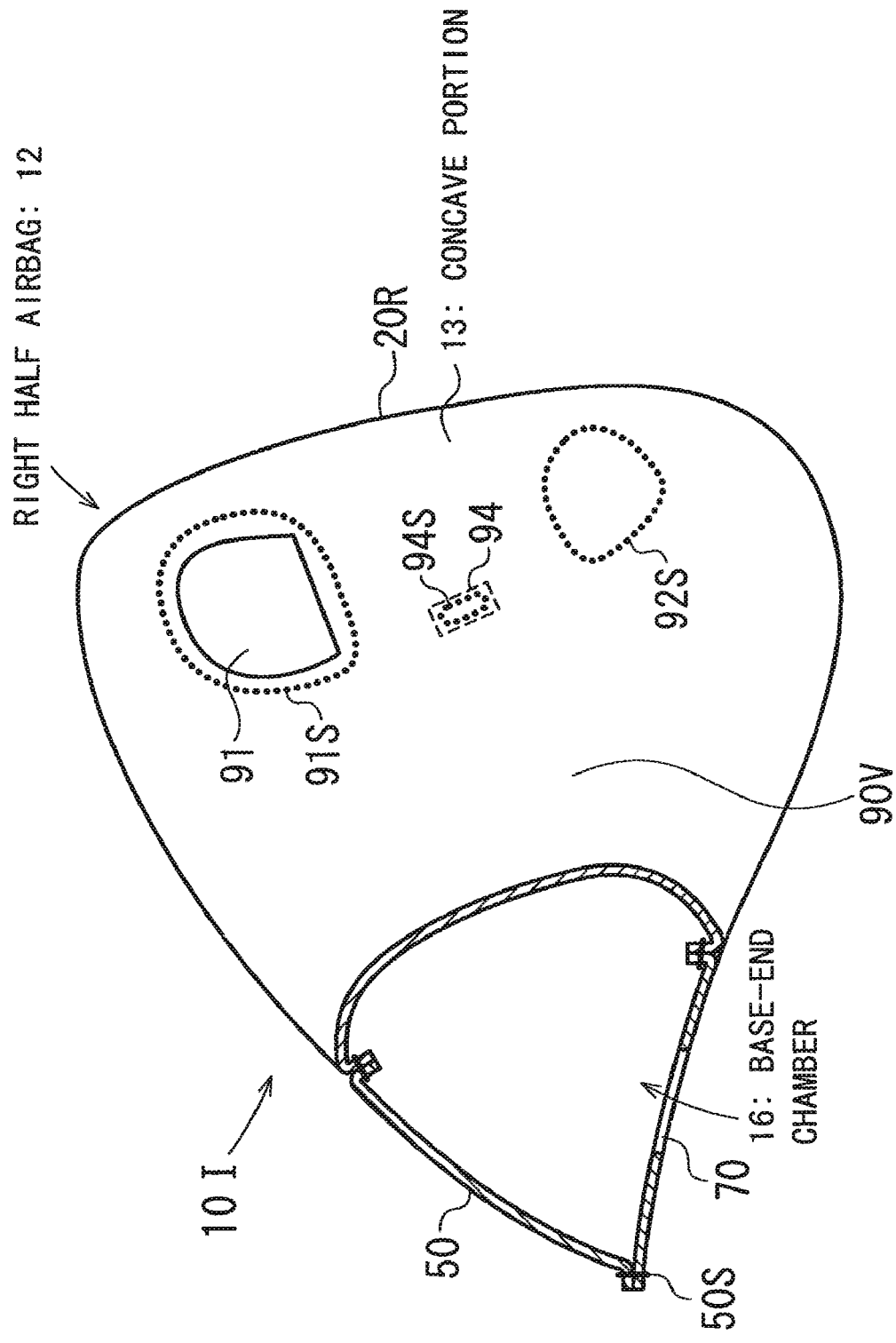
FIG. 26 is a vertical cross-sectional view of the airbag according to an embodiment of the present invention.

An airbag 10I of FIG. 26 is an example of omission of the lower part opening 92. Other arrangements in FIG. 26 are the same as those in FIG. 24, and the same reference numerals denote the same parts.

According to the present invention, the connecting bands 93 and 94 are preferably made of coated fabric, similar to the inside panel 20 and the outside panel 80. This coated fabric is made of a base cloth formed by a woven fabric of synthetic fiber such as nylon, and coated with a silicon resin or the like on one surface.

When the connecting bands 93 and 94 are formed using such a coated fabric, the resin coated surfaces of the connecting bands 93 and 94 preferably face the vehicle front side. With this arrangement, even in a case where the hot gas from the inflator comes in contact with the connecting bands 93 and 94, the heat resistance of the connecting bands 93 and 94 is increased.

FIG. 27 is a vertical cross-sectional view of the same part as FIG. 3 of an airbag 10J according to yet another embodiment.

In this airbag 10J, the depth of the intermediate part of the concave portion 13 is as deep as the upper side.

That is, according to this embodiment, the portion of the seam 90S that extends vertically on the vehicle rear side runs along the rear edge of the opening 91, curving toward the vehicle rear side in the upper part of the concave portion 13. The portion of the seam 90S that extends vertically on the vehicle rear side curves in the intermediate part of the concave portion 13 (that is, in the range L) in the vicinity of the opening 91 (that is, in the upper end vicinity of the range L) along the lower edge of the opening 91 so that it protrudes toward the vehicle rear side, then extends gradually downward at an angle toward the vehicle rear side, curving in the lower part of the concave portion 13 so that it protrudes toward the vehicle rear side along the rear edge of the opening 92. That is, the portion of the seam 90S that extends vertically on the vehicle rear side extends into a shape substantially like the numeral "7" (the substantial "7" shape horizontally flipped in FIG. 27) in the intermediate part of the concave portion 13. With this arrangement, the depth of the concave portion 13 suddenly increases on the lower side of the upper part of the concave portion 13 (i.e., in the vicinity of the upper end of the range L), and then gradually decreases in the downward direction.

A distance q from the upper end of the range L to the deepest part 13b of the concave portion 13 of the airbag 10J is preferably 0 to 250 mm, more preferably 0 to 150 mm.

A depth $d_2'$ of the airbag 10J, from the surface of the airbag 10J facing the occupant to a deepest part 13b of the concave portion 13 is preferably 25 to 400 mm, more preferably 50 to 350 mm.

In the seam 90S, an upward angle θ from the horizontal plane of a portion that is below the deepest part 13b of the concave portion 13 and extends on an angle toward the vehicle rear side is preferably 25 to 50°, more preferably about 30 to 45°.

Other arrangements in FIG. 27 are the same as those in FIG. 3, and the same reference numerals as those in FIG. 3 denote the same parts.

In this airbag 10J, the intermediate part of the concave portion 13 is as deep as the upper side. Therefore, as shown in FIG. 27, the head portion of the small occupant P that has advanced forward into the concave portion 13 in a forward leaning position enters deep into this concave portion 13. With this arrangement, the head portion of the small occupant does not shift left and right and is securely held within the concave portion 13. Further, in the portion below the deepest part 13b of the concave portion 13, the inmost surface of the concave portion 13 inclines toward the vehicle front. As a result, when the face of the small occupant P reaches the inmost surface, the orientation of the face substantially matches that of the inmost surface. With this arrangement, the load on the neck of the occupant is minimized.

Note that the modifications of FIGS. 12 to 16 and 18 to 23 are applicable to FIG. 27 as well.

Figure 28:
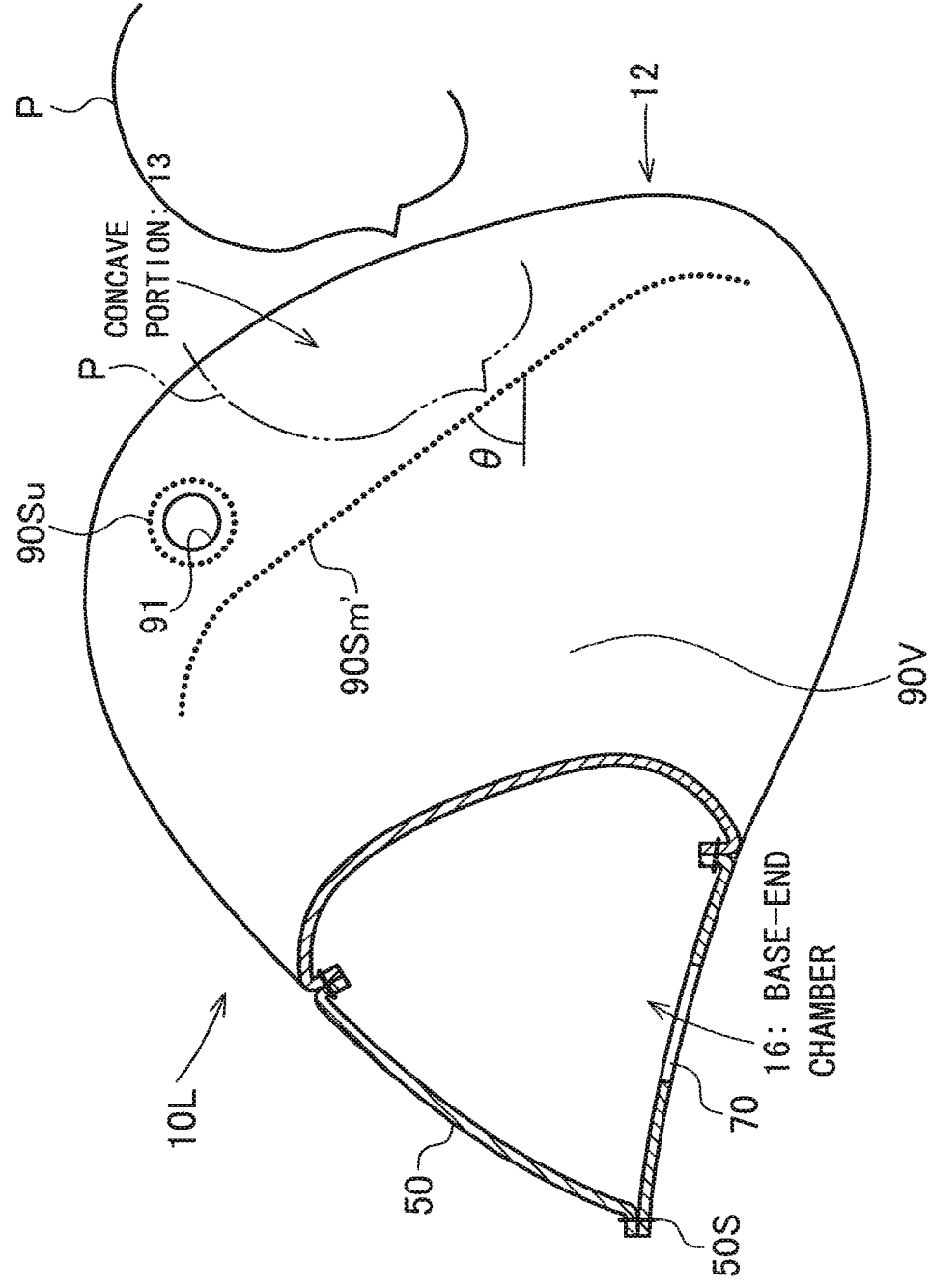
FIG. 28 is a vertical cross-sectional view in the front-back direction of the airbag in an inflated state according to an embodiment of the present invention.

FIG. 28 is a vertical cross-sectional view of the same part as FIG. 3 of an airbag 10L according to yet another embodiment.

In the airbag 10L, a seam that stitches the two face-to-face surfaces of the right half airbag 12 and the left half airbag 14 comprises an upper seam 90Su that stitches the upper parts of the two surfaces together, and a mid-lower seam 90Sm' that continuously stitches together the lower parts of the two surfaces.

According to this embodiment, the upper seam 90Su extends in a circular shape around the opening 91 on the upper side of the concave portion 13. The mid-lower seam 90Sm' extends substantially vertically from the intermediate part toward the lower part of the concave portion 13. As shown in FIG. 28, these seams 90Su and 90Sm' are mutually discontinuous. The mid-lower seam 90Sm' is positioned closer to the vehicle front side than the upper seam 90Su in the intermediate part of the concave portion 13. Furthermore, according to this embodiment, the upper end side of the mid-lower seam 90Sm' extends through the vehicle front side of the upper seam 90Su to the vicinity of the upper end of the airbag 10L.

In the intermediate part of the concave portion 13, the mid-lower seam 90Sm' extends on an angle in a substantially linear shape to the vehicle rear side, to the extent of the lower side. The upward inclination angle θ from the horizontal plane of this portion is preferably 25 to 50°, more preferably about 30 to 45°. The upper end and lower end sides of the mid-lower seam 90Sm' each curve in a substantial arc shape toward the vehicle front side. Furthermore, the mid-lower seam 90Sm' continually stitches together the intermediate parts and lower parts of the two face-to-face surfaces of the right half airbag 12 and the left half airbag 14. Nevertheless, according to the present invention, an intermediate part seam connecting the intermediate parts of the two surfaces and a lower part seam connecting the lower parts of the two surfaces may be separately provided. That is, according to the present invention, the intermediate part seam and lower part seam may be discontinuous. In this embodiment, the opening 92 on the lower side of the concave portion 13 is omitted. When the opening 92 is provided, the lower end side of the mid-lower seam 90Sm' may form a circular shape around the opening 92.

In the airbag 10L the upper seam 90Su is the inmost part of the upper part of the concave portion 13, and the mid-lower seam 90Sm' is the inmost part of the intermediate part and lower part of the concave portion 13. The mid-lower seam 90Sm' is positioned closer to the vehicle front side than the upper seam 90Su, and extends at an angle toward the vehicle rear side to the extend of the lower end side, thereby making the intermediate part of the concave portion 13 deeper than the upper and lower parts thereof.

Other arrangements in FIG. 28 are the same as those in FIG. 3, and the reference numerals identical to those in FIG. 3 denote the same components.

In the airbag 10L as well, the same advantages as those of the airbag 10 in FIGS. 1 to 7 are achieved.

Note that, in FIG. 28 as well, the mid-lower seam 90Sm' may curve so that it protrudes toward the vehicle front side, may curve so that it protrudes to the vehicle rear side, or may be linear in shape.

The inside panel 20 and the outside panel 80, as shown in FIGS. 29A, 29B, 30A, and 30B, are preferably symmetrical in shape when spread horizontally flat on a flat surface. The thread line of the left side 20L (in the direction the base fabric thread extends) and the thread line of the right side 20R are 0° and 90° (refer to FIG. 29A) or 45° (refer to FIG. 29B) with respect to a centerline (vertical line that passes through the lateral middle of the inside panel 20) $CL_1$ of the inside panel 20.

Similarly, the thread line of the outside panel 80 is °0 and 90° (refer to FIG. 30A) or 45° (refer to FIG. 30B) with respect to a centerline (vertical line that passes through the lateral middle of the outside panel 80) $CL_2$ of the outside panel 80.

With the thread lines of the panels 20 and 80 being symmetrical, the levels of strength of the left half airbag 14 and the right half airbag 12 are equalized.

Figure 29A:
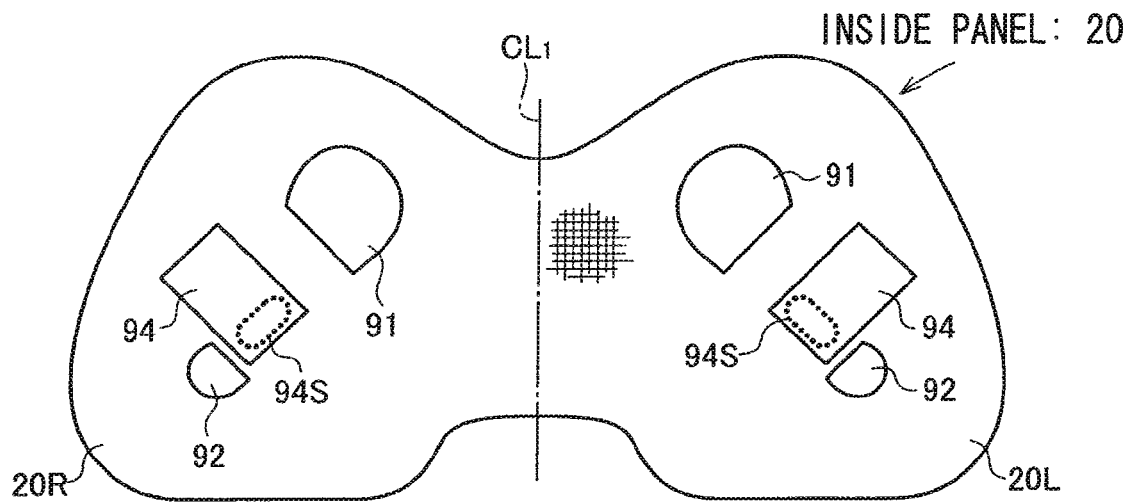
FIG. 29 is a plane view showing the thread line direction of the inside panel.
Figure 29B:
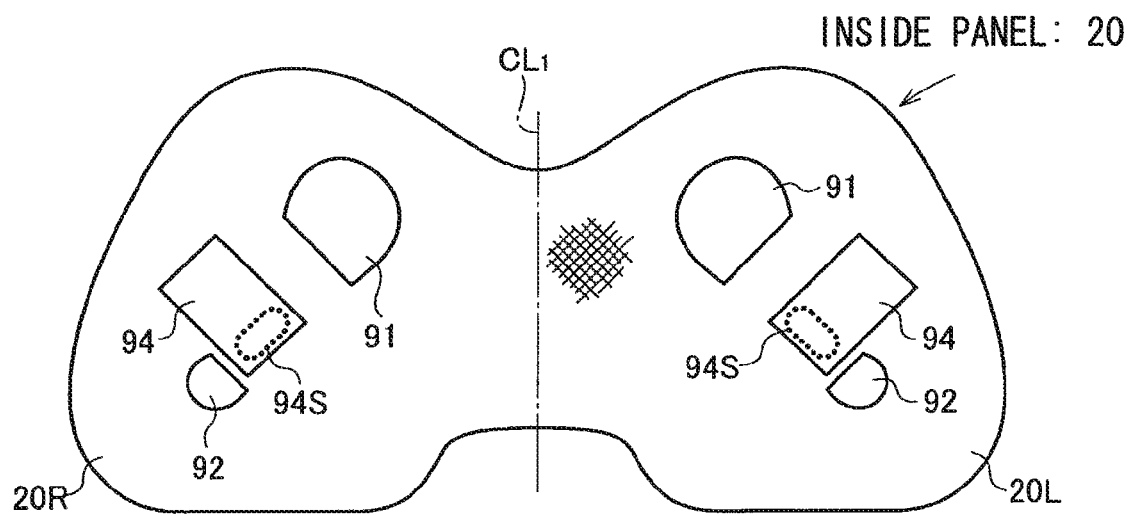
Figure 30A:
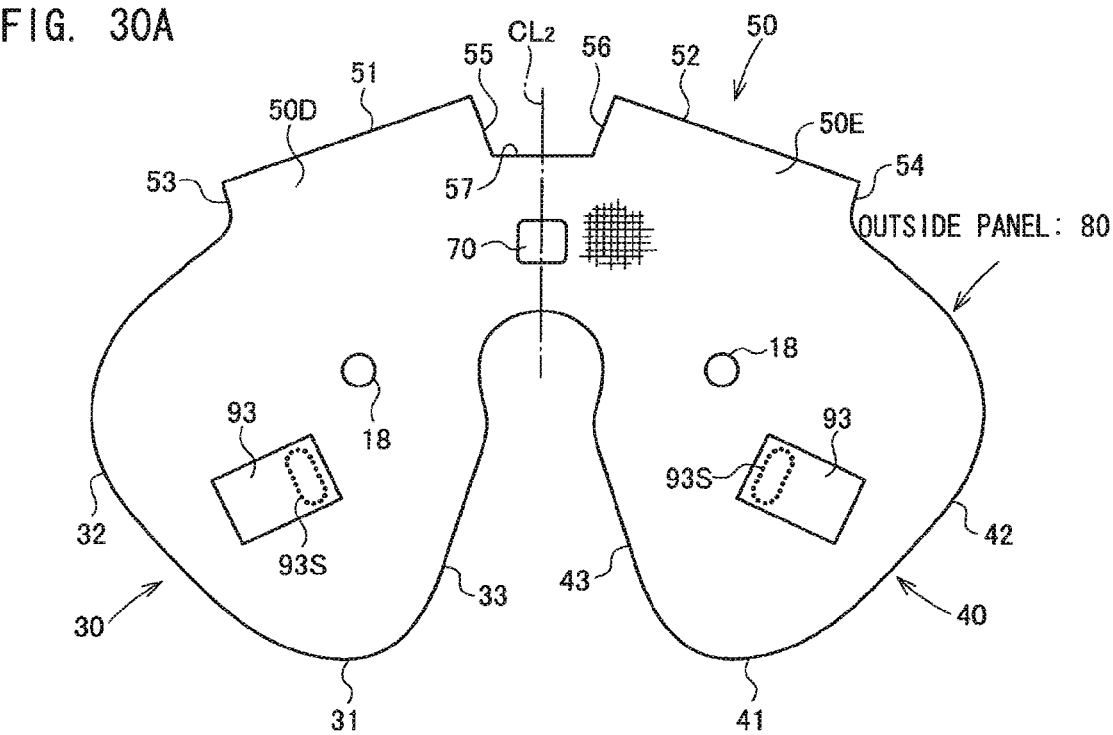
FIG. 30 is a plane view showing the thread line direction of the outside panel.
Figure 30B:
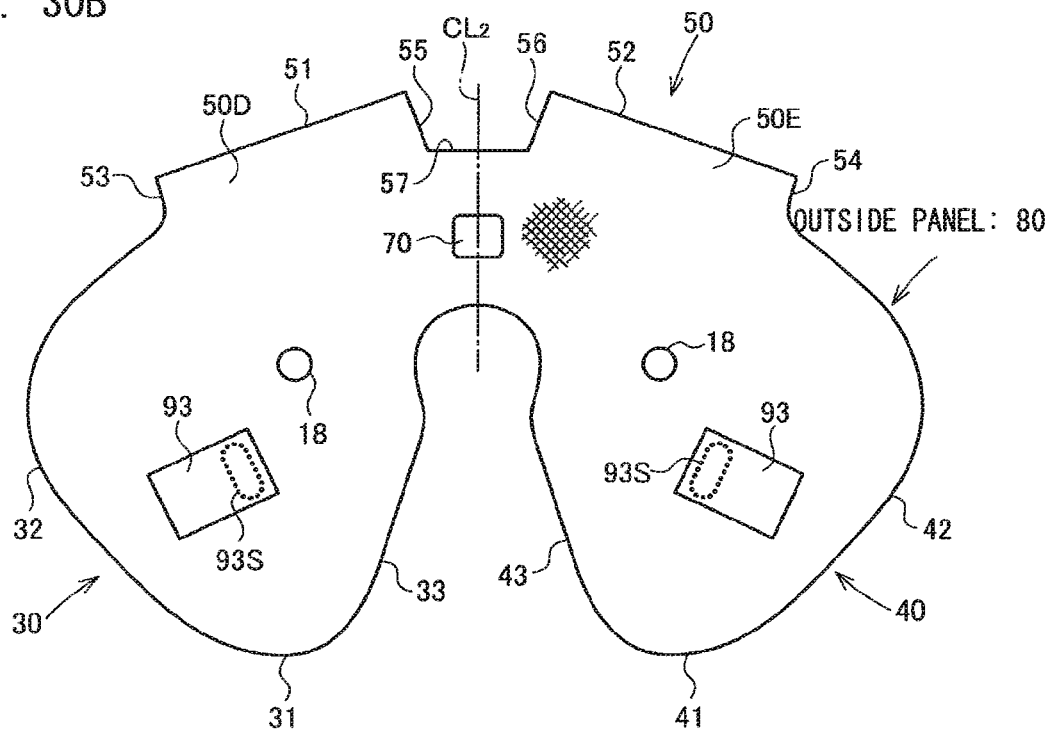

When the both panels 20 and 80 are designed so that the thread lines are in the same direction (preferably 0° and 90°) with respect to the centerlines $CL_1$ and $CL_2$, respectively, and both panels 20 and 80 are spread flat as shown in FIG. 29A and FIG. 30A and placed on top of each other, the thread lines of both panels 20 and 80 become parallel to each other.

Figure 31A:
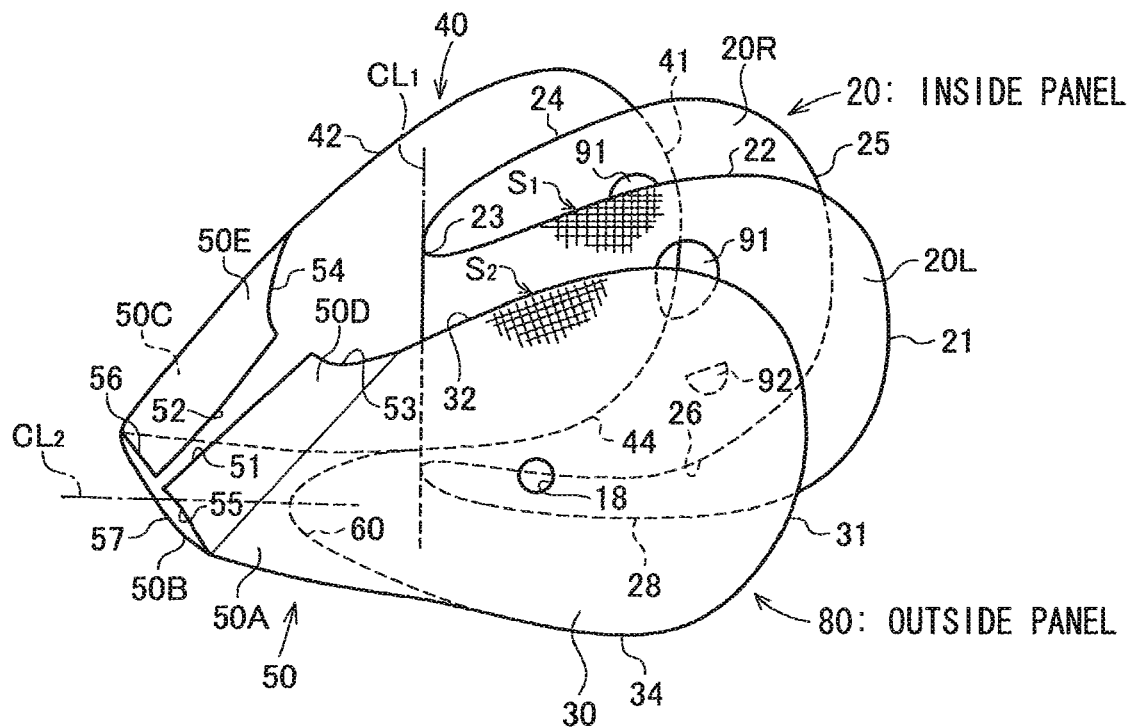
FIG. 31 is an exploded perspective view of the inside panel and the outside panel, and a plane view in the vicinity of the stitching portion of the inside panel outer edge portion and the outside panel outer perimeter portion.

In the above embodiment, as shown in FIG. 31A, the inside panel 20 is folded in two along the centerline $CL_1$ (flat fold) when manufacturing the airbag 10. Conversely, the outside panel 80 is folded (three-dimensionally) so that the mouth surface 50 on the base-end side has the bottom 50B, the left/right side surfaces 50A and 50C, and an upper surface (the flaps 50D and 50E), thereby forming a rectangular shape that has a surface open to the front end of the airbag.

Figure 31B:
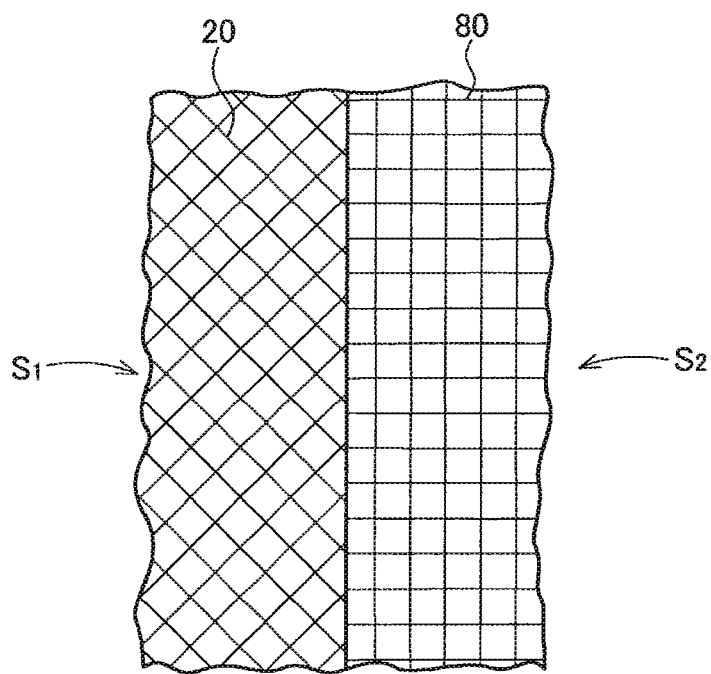

With this arrangement, in the above embodiment, as described above, even if the thread line directions of both panels 20 and 80 are in the same direction with respect to the centerlines $CL_1$ and $CL_2$, respectively, as shown in FIG. 31B, the outer periphery of the panel 20 and the outer periphery of the panel 80 overlap with the thread lines in different directions (non-parallel directions). With the panels 20 and 80 thus stitched together with the thread lines in non-parallel directions, the stitch strength of both the panels 20 and 18 is higher compared to a case where stitching is performed with the thread lines parallel.

Furthermore, with the panels 20 and 80 having thread lines at 0° and 90° with respect to the centerlines $CL_1$ and $CL_2$, the unused portions that remain when the base cloth is cut out from the band of fabric (cloth) is minimized, thereby improving cutout efficiency. That is, the number of panels 20 and 80 that can be cut out from the cloth of a unit length increases.

While the invention has been explained with reference to the specific embodiments of the invention, the explanation is illustrative and the invention may be practiced in various other forms.

What is claimed is:

1. An airbag comprising:
    an airbag body;
    a panel assembly for forming the airbag body;
    a vertically extended concave portion of the airbag body formed so as to face a front-passenger seat occupant in an inflated state in front of the occupant;
    a left chamber in the airbag body positioned in front of a left half of the occupant;
    a right chamber in the airbag body positioned in front of a right half of the occupant;
    a portion of the panel assembly that separates said left chamber and said right chamber; and
    a first through opening disposed at an upper part of said panel assembly portion that connects said left chamber and said right chamber, wherein:
    a depth of said concave portion in an intermediate part along a vertical direction is greater than both of a depth of said concave portion in an upper part and a depth of said concave portion in a lower part.

2. The airbag according to claim 1, wherein:
    an opening area of said first opening is 7,500 to 50,000 mm$^2$; and
    a height from a lowest end of said airbag body in the inflated state to an occupant side of a lower edge of said first opening in the inflated state is 200 to 670 mm.

3. The airbag according to claim 1, further comprising
    a second opening disposed at a lower part of said panel assembly portion that connects said left chamber and said right chamber.

4. The airbag according to claim 3, wherein:
    an opening area of said second opening is 1,200 to 32,000 mm$^2$; and
    a height from an upper edge of said second opening in the inflated state to a lower edge of said second opening in the inflated state is 35 to 200 mm.

5. The airbag according to claim 1, wherein:
    a depth $d_1$ of the concave portion in the upper part is 5 to 200 mm;
    a depth $d_2$ of the concave portion in the intermediate part is 25 to 400 mm; and
    a depth $d_3$ of the concave portion in the lower part is 5 to 200 mm.

6. The airbag according to claim 5, wherein:
    the concave portion in said intermediate part is a portion having a depth of 25 to 400 mm, and
    the concave portion in said intermediate part extends vertically 150 to 400 mm.

7. The airbag according to claim 6, wherein:
    in said intermediate part, the more the concave portion is in an upper part, the more a depth of the concave portion is greater.

8. The airbag according to claim 5, wherein:
    the concave portion in said intermediate part is configured so that a tangential direction within a vertical plane of at least one portion of an inmost part of the concave portion is inclined toward a vehicle front.

9. The airbag according to claim 1, further comprising:
    a base-end chamber of the airbag body disposed on a vehicle front side;
    a left half airbag of the airbag body having the left chamber therein with the left chamber being that is continuous with said base-end chamber and is to be for being inflated on a front left side of the occupant; and
    a right half airbag of the airbag body having the right chamber therein with the right chamber being continuous with said base-end chamber for being inflated on a front right side of the occupant; wherein:
    said left half airbag and said right half airbag are stitched together on mutually face-to-face portions of the panel assembly portion;
    a thread line of said stitching extends vertically; and
    said thread line in said intermediate part curves so that at least one portion of the thread is positioned away from a surface facing the occupant.

10. The airbag according to claim 1, further comprising
    a hollow portion that passes substantially vertically through a space outside said airbag body and about which said airbag body in the inflated state extends with said airbag body inflating from an instrument panel of the vehicle toward a vehicle rear so as to approach the occupant, wherein
    said hollow portion is configured so that, when said airbag body is in the inflated state, at least one portion of a lower end side of said hollow portion is positioned closer to a vehicle rear than an end portion on a vehicle rear side of the instrument panel.

11. An airbag device having the airbag according to claim 1, further comprising
    an inflator that inflates said airbag body.

12. A vehicle having the airbag device according to claim 11.

* * * * *